United States Patent
Emmanuel et al.

(10) Patent No.: US 10,575,310 B2
(45) Date of Patent: Feb. 25, 2020

(54) WIRELESS COMMUNICATION IN AN ENVIRONMENT WITH ELECTRONIC INTERFERENCE

(71) Applicant: NETGEAR, Inc., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 454 days.

(21) Appl. No.: 15/077,719

(22) Filed: Mar. 22, 2016

(65) Prior Publication Data
US 2017/0280460 A1 Sep. 28, 2017

(51) Int. Cl.
| | |
|---|---|
| *H04W 72/08* | (2009.01) |
| *H04W 28/02* | (2009.01) |
| *H04L 5/00* | (2006.01) |
| *H04L 1/18* | (2006.01) |
| *H04L 1/00* | (2006.01) |
| *H04L 12/805* | (2013.01) |
| *H04L 12/26* | (2006.01) |
| *H04W 52/02* | (2009.01) |
| *H04W 72/04* | (2009.01) |
| *H04W 28/18* | (2009.01) |
| *H04W 84/12* | (2009.01) |

(52) U.S. Cl.
CPC ......... *H04W 72/082* (2013.01); *H04L 1/0003* (2013.01); *H04L 1/0007* (2013.01); *H04L 1/0013* (2013.01); *H04L 1/1854* (2013.01); *H04L 5/0055* (2013.01); *H04L 5/0062* (2013.01); *H04L 43/0847* (2013.01); *H04L 47/365* (2013.01); *H04W 28/0236* (2013.01); *H04W 52/0222* (2013.01); *H04W 72/0446* (2013.01); *H04L 1/0009* (2013.01); *H04W 28/18* (2013.01); *H04W 84/12* (2013.01); *Y02D 70/00* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01)

(58) Field of Classification Search
CPC . H04W 28/0236; H04L 1/0007; H04L 47/365
See application file for complete search history.

(56) References Cited

U.S. PATENT DOCUMENTS

| | | |
|---|---|---|
| 4,648,124 A | 3/1987 | Mantovani et al. |
| 6,771,698 B1 | 8/2004 | Beck |
| 7,539,489 B1 | 5/2009 | Alexander |
| 8,620,301 B1 | 12/2013 | Hessel |

(Continued)

*Primary Examiner* — Hoon J Chung
(74) *Attorney, Agent, or Firm* — Perkins Coie LLP

(57) ABSTRACT

Methods, apparatuses, and embodiments related to wireless communication in an environment with electromagnetic interference. In some embodiments, a wireless communication parameter of a wireless device, such as a wireless local area network (WLAN) device, is set to a first value, and a first frame or packet is wirelessly transmitted or received by the wireless device. An electromagnetic signal that interferes with wireless transmission is detected. Based on the detection of the wireless transmission interference, the wireless communication parameter is set to a second value to increase communication throughput, and a second frame or packet is wirelessly transmitted or received.

12 Claims, 13 Drawing Sheets

(56) References Cited

U.S. PATENT DOCUMENTS

| | | |
|---|---|---|
| 8,750,806 B2 | 6/2014 | Weil et al. |
| 9,338,638 B1 | 5/2016 | Palin et al. |
| 9,621,201 B1 | 4/2017 | Peric et al. |
| 9,992,690 B2 | 6/2018 | Butchko et al. |
| 10,044,426 B1 | 8/2018 | Pawar et al. |
| 2003/0060193 A1 | 3/2003 | Kurita |
| 2004/0137915 A1 | 7/2004 | Diener et al. |
| 2006/0013256 A1* | 1/2006 | Lee .................... H04W 28/06 370/473 |
| 2006/0194553 A1 | 8/2006 | Ozaki et al. |
| 2006/0223442 A1 | 10/2006 | Stephens |
| 2006/0224730 A1 | 10/2006 | Fok et al. |
| 2008/0056340 A1 | 3/2008 | Foegelle |
| 2008/0181133 A1 | 7/2008 | Thubert et al. |
| 2009/0029645 A1 | 1/2009 | Leroudier |
| 2009/0201898 A1* | 8/2009 | Gong .................... H04L 1/0007 370/338 |
| 2010/0137021 A1 | 6/2010 | Sharret et al. |
| 2010/0233969 A1 | 9/2010 | Frolik et al. |
| 2010/0285753 A1 | 11/2010 | Foegelle |
| 2011/0053622 A1 | 3/2011 | Maruo et al. |
| 2011/0300809 A1 | 12/2011 | Gordiyenko et al. |
| 2011/0306306 A1 | 12/2011 | Reed |
| 2012/0045998 A1 | 2/2012 | Hsiao |
| 2012/0100813 A1 | 4/2012 | Mow et al. |
| 2013/0149972 A1 | 6/2013 | Luong et al. |
| 2013/0188509 A1 | 7/2013 | Mellein et al. |
| 2013/0257454 A1 | 10/2013 | Mow et al. |
| 2013/0260705 A1 | 10/2013 | Stratford |
| 2013/0310109 A1 | 11/2013 | Filipovic et al. |
| 2014/0003409 A1 | 1/2014 | Van De Laar et al. |
| 2014/0071937 A1 | 3/2014 | Klatt |
| 2014/0087668 A1 | 3/2014 | Mow et al. |
| 2015/0103663 A1 | 4/2015 | Amini et al. |
| 2015/0111507 A1 | 4/2015 | Alpert |
| 2016/0037515 A1* | 2/2016 | Xie .................... H04L 5/0055 370/329 |
| 2016/0100437 A1 | 4/2016 | Armstrong et al. |
| 2016/0198350 A1 | 7/2016 | Lou et al. |
| 2016/0212745 A1 | 7/2016 | Hiertz et al. |
| 2016/0234807 A1 | 8/2016 | Levy et al. |
| 2016/0323888 A1* | 11/2016 | Ryu .................... H04B 1/10 |
| 2016/0345335 A1 | 11/2016 | Gallien |
| 2017/0064042 A1 | 3/2017 | Vora et al. |
| 2017/0094575 A1 | 3/2017 | Bercovici et al. |
| 2017/0134241 A1 | 5/2017 | Jang et al. |
| 2017/0279546 A1 | 9/2017 | McGarry et al. |
| 2017/0325177 A1 | 11/2017 | Liu et al. |
| 2017/0339576 A1 | 11/2017 | Brommer et al. |
| 2018/0255469 A1 | 9/2018 | Butchko et al. |

* cited by examiner

| MCS index | Spatial streams | Modulation type | Coding rate | Data rate (Mbit/s) | | | |
|---|---|---|---|---|---|---|---|
| | | | | 20 MHz channel | | 40 MHz channel | |
| | | | | 800 ns GI | 400 ns GI | 800 ns GI | 400 ns GI |
| 0 | 1 | BPSK | 1/2 | 6.50 | 7.20 | 13.50 | 15.00 |
| 1 | 1 | QPSK | 1/2 | 13.00 | 14.40 | 27.00 | 30.00 |
| 2 | 1 | QPSK | 3/4 | 19.50 | 21.70 | 40.50 | 45.00 |
| 3 | 1 | 16-QAM | 1/2 | 26.00 | 28.90 | 54.00 | 60.00 |
| 4 | 1 | 16-QAM | 3/4 | 39.00 | 43.30 | 81.00 | 90.00 |
| 5 | 1 | 64-QAM | 2/3 | 52.00 | 57.80 | 108.00 | 120.00 |
| 6 | 1 | 64-QAM | 3/4 | 58.50 | 65.00 | 121.50 | 135.00 |
| 7 | 1 | 64-QAM | 5/6 | 65.00 | 72.20 | 135.00 | 150.00 |
| 8 | 2 | BPSK | 1/2 | 13.00 | 14.40 | 27.00 | 30.00 |
| 9 | 2 | QPSK | 1/2 | 26.00 | 28.90 | 54.00 | 60.00 |
| 10 | 2 | QPSK | 3/4 | 39.00 | 43.30 | 81.00 | 90.00 |
| 11 | 2 | 16-QAM | 1/2 | 52.00 | 57.80 | 108.00 | 120.00 |
| 12 | 2 | 16-QAM | 3/4 | 78.00 | 86.70 | 162.00 | 180.00 |
| 13 | 2 | 64-QAM | 2/3 | 104.00 | 115.60 | 216.00 | 240.00 |
| 14 | 2 | 64-QAM | 3/4 | 117.00 | 130.00 | 243.00 | 270.00 |
| 15 | 2 | 64-QAM | 5/6 | 130.00 | 144.40 | 270.00 | 300.00 |
| 16 | 3 | BPSK | 1/2 | 19.50 | 21.70 | 40.50 | 45.00 |
| 17 | 3 | QPSK | 1/2 | 39.00 | 43.30 | 81.00 | 90.00 |
| 18 | 3 | QPSK | 3/4 | 58.50 | 65.00 | 121.50 | 135.00 |
| 19 | 3 | 16-QAM | 1/2 | 78.00 | 86.70 | 162.00 | 180.00 |
| 20 | 3 | 16-QAM | 3/4 | 117.00 | 130.00 | 243.00 | 270.00 |
| 21 | 3 | 64-QAM | 2/3 | 156.00 | 173.30 | 324.00 | 360.00 |
| 22 | 3 | 64-QAM | 3/4 | 175.50 | 195.00 | 364.50 | 405.00 |
| 23 | 3 | 64-QAM | 5/6 | 195.00 | 216.70 | 405.00 | 450.00 |
| 24 | 4 | BPSK | 1/2 | 26.00 | 28.80 | 54.00 | 60.00 |
| 25 | 4 | QPSK | 1/2 | 52.00 | 57.60 | 108.00 | 120.00 |
| 26 | 4 | QPSK | 3/4 | 78.00 | 86.80 | 162.00 | 180.00 |
| 27 | 4 | 16-QAM | 1/2 | 104.00 | 115.60 | 216.00 | 240.00 |
| 28 | 4 | 16-QAM | 3/4 | 156.00 | 173.20 | 324.00 | 360.00 |
| 29 | 4 | 64-QAM | 2/3 | 208.00 | 231.20 | 432.00 | 480.00 |
| 30 | 4 | 64-QAM | 3/4 | 234.00 | 260.00 | 486.00 | 540.00 |
| 31 | 4 | 64-QAM | 5/6 | 260.00 | 288.80 | 540.00 | 600.00 |

| AC | CWmin | CWmax |
|---|---|---|
| Background (AC_BK) | aCWmin | aCWmax |
| Best Effort (AC_BE) | aCWmin | aCWmax |
| Video (AC_VI) | (aCWmin+1)/2-1 | aCWmin |
| Voice (AC_VO) | (aCWmin+1)/4-1 | (aCWmin+1)/2-1 |

810

| AC | CWmin | CWmax | AIFSN | Max TXOP |
|---|---|---|---|---|
| Background (AC_BK) | 15 | 1023 | 7 | 0 |
| Best Effort (AC_BE) | 15 | 1023 | 3 | 0 |
| Video (AC_VI) | 7 | 15 | 2 | 3.008ms |
| Voice (AC_VO) | 3 | 7 | 2 | 1.504ms |
| Legacy DCF | 15 | 1023 | 2 | 0 |

815

| | 802.1D | | | 802.11e | |
|---|---|---|---|---|---|
| Priority | Priority Code Point (PCP) | Acronym | Traffic Type | Access Category (AC) | Designation |
| Lowest | 1 | BK | Background | AC_BK | Background |
| | 2 | -- | Spare | AC_BK | Background |
| | 0 | BE | Best Effort | AC_BE | Best Effort |
| | 3 | EE | Excellent Effort | AC_BE | Best Effort |
| | 4 | CL | Controlled Load | AC_VI | Video |
| | 5 | VI | Video | AC_VI | Video |
| | 6 | VO | Voice | AC_VO | Voice |
| Highest | 7 | NC | Network Control | AC_VO | Voice |

FIG. 8

WIRELESS COMMUNICATION IN AN ENVIRONMENT WITH ELECTRONIC INTERFERENCE

TECHNICAL FIELD

The present disclosure relates generally to electronic communications, and more specifically, to improving wireless communications in an environment with electromagnetic interference from other devices that communicate wirelessly or otherwise emit electromagnetic radiation.

BACKGROUND

With the evolving technologies of wireless networks, embedded systems, the Internet, etc., there is an ever increasing demand for increased network bandwidth and higher network speed from all kinds of electronic devices employed in various settings, from computing and managing data to online shopping and social networking. This is particularly relevant with electronic and digital content having become extensively used in shared, networked environments as compared to traditional stand-alone personal computers and mobile devices. As a result, data traffic, and especially wireless data traffic, has experienced an enormous growth.

In the meantime, more and more wireless technologies used in electronic devices that communicate wirelessly, such as via wireless local area networks, occupy the same or similar radio frequency bands (e.g., 2.4 GHz, 3.6 GHz, 5 GHz, 60 GHz, etc.) as other wireless communication devices. These devices, which can include wireless local area network devices, baby monitors, wireless toys, microwave ovens, Smart Power Meters, etc., can create interference with one another, adversely affecting network transmission as well as reception of the wireless network circuits onboard electronic devices. Also, many of these electronic devices are mobile or portable devices which rely on limited power resources to operate, and typically transmitting or receiving data traffic in a noisy environment can have a negative impact on power consumption.

SUMMARY

As wireless technology and wireless communication devices have progressed, the technology continues to proliferate, becoming more and more ubiquitous. With the proliferation of wireless devices, such as cell phones, Wi-Fi routers, cordless phones, baby monitors, wireless toys, etc., sources of electromagnetic signals that can interfere with wireless communications have increased dramatically. Many such devices communicate at the same or similar radio frequency bands and can interfere with other devices that also communicate at these radio frequency bands. Further, many wireless communication technologies were not developed to communicate robustly when faced with such interference. As a result, technology that improves communication when in environments with such interference is needed.

Introduced here is technology related to improving communication in environments with electromagnetic interference. Some disclosed embodiments vary a wireless communication parameter based on detection of wireless communication interference. When the environment has reduced interference, a wireless device can wirelessly send or receive data with a wireless communication parameter set to a first value. Examples of wireless communication parameters include a parameter that affects the size of a frame, packet, block, etc. of data that is sent wirelessly, that affects data rate of wireless transmission of an ACK frame, that affects an enhanced distributed channel access (EDCA) algorithm that is used for wireless transmission, etc. When interference is detected, such as interference of a certain type or above a certain threshold, the wireless device can set the wireless communication parameter to a second value that improves communication, such as by setting the wireless communication parameter to a value that reduces the size of the frame/packet/block/etc. of data that is sent wirelessly, that reduces the transmission rate of an ACK frame, that causes a different EDCA algorithm to be used, etc.

Some other disclosed embodiments include, for example: changing processing of a WLAN data transmission to cause a receiving WLAN device to determine whether data of a data transmission being received is intended for the receiving WLAN device, and causing the receiving WLAN device to cancel the receiving of the data before the WLAN device receives all of the data of the data transmission; a receiving WLAN device detecting a type of electronic interference, sending a message to a transmitting WLAN device that causes the transmitting WLAN device to change a size of a frame/packet/block/etc. of data, and receiving a frame/packet/block/etc. of data that conforms to the changed size, etc. The above lists of disclosed embodiments is only partial, and the specification includes other disclosed embodiments.

BRIEF DESCRIPTION OF THE DRAWINGS

One or more embodiments are illustrated by way of example in the figures of the accompanying drawings, in which like references indicate similar elements.

FIG. 7 is a table listing modulation and coding scheme (MCS) index values, consistent with various embodiments.

FIG. 8 is an illustration of three tables that list parameters related to Enhanced Distributed Channel Access (EDCA), consistent with various embodiments.

DETAILED DESCRIPTION

Figure 1A:
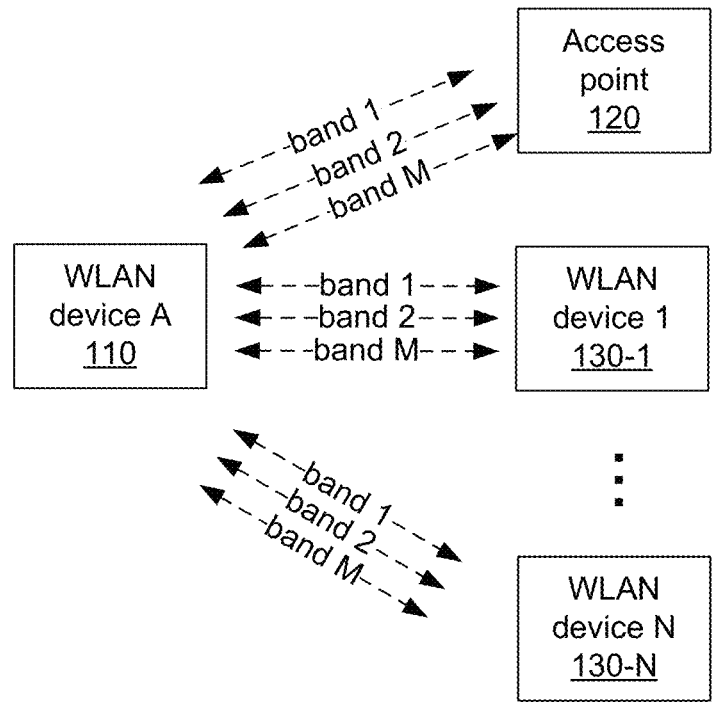
FIG. 1A is an illustration of an example system where a wireless client communicates via one or more bands, consistent with various embodiments.

Techniques are disclosed for improving communication in an environment that includes electromagnetic interference. Interference can come from a wide variety of sources, such as wireless local area network (WLAN) devices, cell phones, cordless phones, baby monitors, wireless toys, microwaves, etc. Some of these devices have been designed to be compatible, such as wireless devices that implement a same protocol, such as some WLAN devices that implement the Institute of Electrical and Electronic Engineers (IEEE) 802.11 WLAN standard (e.g., WiFi). Others are not compatible, such as a baby monitor that communicates at a similar radio frequency as a WiFi device.

In some environments, such as in an office building, multiple WiFi devices can be distributed throughout the environment. The WiFi devices can be of various models, each potentially from a different manufacturer. While these various devices may each be marketed as being a WiFi device that implements the IEEE 802.11 standard, each device may have somewhat different implementations of the standard.

For example, two manufacturers may implement the Distributed Coordination Function (DCF) of the IEEE 802.11 standard, which is a protocol for minimizing packet collisions, but may implement it in different ways. A packet collision is where a receiving device receives more than one packet at a time, resulting in neither packet being correctly received. The protocol calls for two devices, that interfere with each other when packets that they send collide, to back off from their transmission for a random back-off time. As an example of different implementations, one manufacturer may try to improve performance of their device by shortening the random back-off time, which may not be in full compliance with the IEEE 802.11 standard, so that their device hopefully tries to claim an open channel before another device competing for the channel. By shortening the random back-off time, the device may have an advantage in gaining access to an available communication channel, and may, as a result, have higher communication performance than a competing device that does fully comply to the standard. As this example demonstrates, even some devices that implement a common standard that includes features to minimize interference between multiple devices can have undesirable levels of interference.

The interference problem is exacerbated when incompatible devices share a common radio frequency. In the above example, the standard is designed so that multiple devices can share a common radio frequency, and the multiple devices can fairly and efficiently share this common radiofrequency. However, one manufacturer did not fully adhere to the standard, and attempted to, one may argue unfairly, obtain more access to the communication channel than other compatible devices. However, when devices are incompatible, there is no protocol for fairly sharing a common radio frequency. In such a case, communication throughput and efficiency can be severely degraded due to interference between the incompatible devices.

In the following disclosure, technology for improving communication when faced with interference, such as in the above examples, is disclosed. Some disclosed embodiments vary a wireless communication parameter based on detection of wireless transmission interference. When the environment has reduced interference, a wireless device can wirelessly send or receive data with a wireless communication parameter set to a first value. When interference is detected, such as interference of a certain type or above a certain threshold, the wireless device can set the wireless communication parameter to a second value that improves communication.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure.

The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication (e.g., a network) between components. The present embodiments are not to be construed as limited to specific examples described herein but rather to include within their scope all embodiments defined by the appended claims.

Further, in this description the term "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

For purposes of discussion herein, "heterogeneous radios" means a plurality of radios or wireless network circuits of different network technologies; for example, IEEE 802.11 Wireless LAN (e.g., WiFi), Bluetooth, 2G, 3G, Long Term Evolution (LTE), and Global Navigation Satellite System (GNSS) are all different network technologies than one another. Conversely, "homogeneous radios" means a plurality of radios or wireless network circuits of the same network technologies; for example, a plurality of Wireless LAN (WLAN) circuits, although one may operate on channel 1 of 2.4 GHz frequency band and using IEEE 802.11n protocol while another may operate on channel 6 of 2.4 GHz frequency band and using IEEE 802.11g protocol, are of the same family of WLAN technology and therefore are homogeneous radios. Some examples of the commonly-seen radios on the 2.4 GHz frequency band may include IEEE 802.11b, IEEE 802.11g, or IEEE 802.11n.

FIG. 1A is an illustration of an example system where a wireless client communicates via one or more bands, consistent with various embodiments. Any of the WLAN devices depicted in FIG. 1A can be processing device 1000 of FIG. 10. WLAN device A 110 of FIG. 1A can communicate with other WLAN devices, such as with access point 120, or with other WLAN devices, such as WLAN devices 130-1 . . . 130-N in a WLAN network. For example, WLAN device A 110 can communicate with access point 120 using one or more channels in one or more bands, such as band 1, band 2, and/or band M. In some embodiments, WLAN device A 110 can communicate with access point 120 simultaneously over two or more bands, such as simultaneously over band 1, band 2, and band M. Alternatively, or in addition, WLAN device A 110 can communicate with one or more peers in the network, such as WLAN device 1 130-1 . . . WLAN device N 130-N using one or more channels in one or more bands, such as band 1, band 2, and/or band M. This communication can also be simultaneous over two or more bands, or can be over a single band. While three bands (band 1, band 2, and band M) are shown, fewer or more than three bands can be used by WLAN device A 110 to communicate with the other wireless devices 120, 130-1 . . . 130-N. For example, in some embodiments, WLAN device A 110 is able to communicate with access point 120 only over a single band, such as band 1. To communicate simultaneously over multiple bands, in some embodiments, WLAN device A 110 has a separate radio for each band or radio that can be operated simultaneously in one or more or all the bands. In some embodiments, WLAN device A 110 can have more than one radio in one or more bands. In some embodiments, WLAN device A 110 has one radio.

Figure 1B:
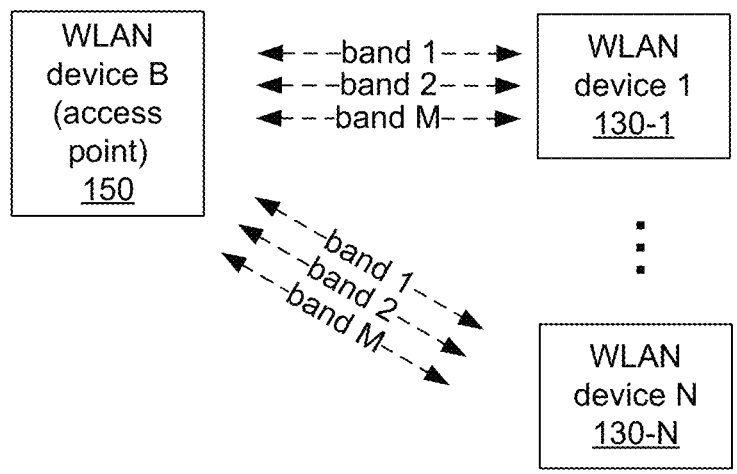
FIG. 1B is an illustration of an example system where a wireless device is used as an access point, and the access point communicates via one or more bands, consistent with various embodiments.

FIG. 1B is an illustration of an example system where a wireless device is used as an access point, and the access point communicates via one or more bands, consistent with various embodiments. Any of the WLAN devices depicted in FIG. 1B can be processing device 1000 of FIG. 10. WLAN device B 150 of FIG. 1B is configured to operate as an access point. WLAN device B 150 can communicate with other WLAN devices, such as WLAN device 1 130-1 . . . WLAN device N 130-N over one or more bands, such as band 1, band 2, and/or band M, and using one or more channels in one or more of the bands. Again, while only three bands, band 1, band 2, and band M, are shown, more than three bands can be used simultaneously by client B 150 to communicate with the other wireless devices 130-1 . . . 130-N. To communicate simultaneously over multiple bands, in some embodiments, client B 150 has a separate radio for each band, and in some embodiments, client B 150 can have more than one radio in one or more bands.

Figure 2:
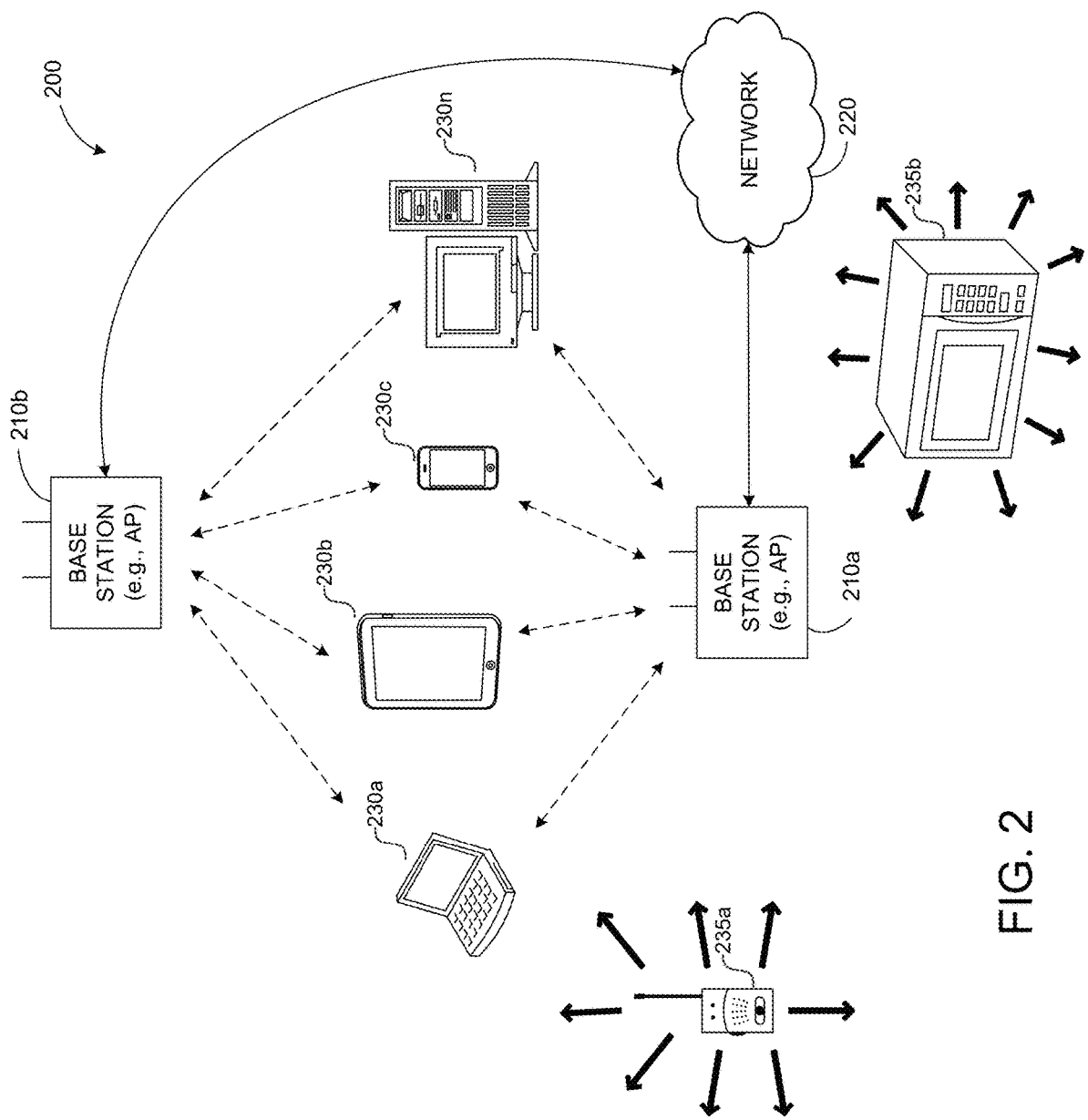
FIG. 2 is an illustration of a representative wireless network environment within which some embodiments many be implemented, consistent with various embodiments.

One reason for enabling simultaneous communication over multiple bands is to provide a more robust connection between wireless devices. The reliability of communications over wireless channels depends strongly upon the physical environment in which the communication is occurring, and the physical environment and, thus, the characteristics of wireless channels are continuously changing. Moreover, there is no reservation or spectrum assignment for devices in the industrial, scientific, and medical (ISM) bands used for wireless communication; transmitters are only required to follow the Federal Communications Commission's rules regarding maximum power and other emission requirements. Thus, interference may arise from one or more other transmitters operating in a same band as the wireless device. For example, if a client is connected to a home access point, and a microwave oven, such as microwave over 235b of FIG. 2, is turned on, a connection to an access point, such as base station 210 of FIG. 2, over the 2.4 GHz band may deteriorate due to interference because the microwave oven has emissions in the 2.4 GHz band. Similarly, baby monitors also operate on the 2.4 GHz band so if a baby monitor, such as baby monitor 235a of FIG. 2, is close to a cell phone or an access point, the connection is also likely to deteriorate. Bluetooth devices are another class of wireless devices that may be active in the 2.4 GHz band. Moreover, undesired noise may be emitted in the ISM bands from other devices in the home.

A conventional cell phone may have hardware installed that allows it to connect to an access point over the 2.4 GHz band or the 5 GHz band, but not both simultaneously. Further, once the conventional cell phone has made a connection on one of the bands, for example, the 2.4 GHz band, in some embodiments, it may not switch to the 5 GHz band because the software may not be sufficiently sophisticated to identify that there is a problem on the 2.4 GHz band and switch over to the 5 GHz band. Even if the cell phone is sufficiently intelligent to switch bands when needed, there may be a transition time between the bands during which the cell phone may not be able to transmit and receive data. However, if a WLAN client such as a cell phone is connected simultaneously on both the 2.4 GHz band and the 5 GHz band, or other bands as described herein, and interference arises from, for example, a baby monitor operating in the 2.4 GHz band in the vicinity of the access point, the cell phone can rely upon communications over a channel in the 5 GHz band, rather than maintaining a noisy connection in the 2.4 GHz band or, perhaps, losing the connection altogether if the connection relies solely on a 2.4 GHz channel Further, communicating simultaneously over multiple bands provides more robustness to wireless communications because packets can be re-transmitted on a different band when a radio operating in a first band is not capable of delivering packets to the intended recipient. For example, if a cell phone has a 5 GHz connection to an access point, as the user of the cell phone moves farther away from the access point, the 5 GHz connection may use lower transmission rates, or it may disconnect due to path loss and drop its wireless signal. But if there is a simultaneous 2.4 GHz connection, the cell phone may rely on the 2.4 GHz connection, which has a greater range, and the user will experience any interruption in service.

While communications over the 2.4 GHz band, for example, using one of the IEEE 802.11 n/b/g protocols and communications over the 5 GHz band, for example, using one of the IEEE 802.11ac/n/a protocols have been mentioned above, other bands can also be used for communication instead of, or in addition to, these bands. These other bands include, for example, the 60 GHz band that follows IEEE 802.11ad protocol, television white spaces (TVWS) having operating frequencies in the very high frequency (VHS)/ultra-high frequency (UHF) bands (i.e., IEEE 802.11af or others), (e.g., 470 MHz-790 MHz in Europe and 54 MHz-698 MHz in the United States), and the sub-1 GHz ISM bands, using the IEEE 802.11ah protocol, whose exact ranges may by country-dependent.

In some embodiments, WLAN modules may have multiple radios that are active simultaneously in a particular band, and/or some WLAN modules may have multiple radios active simultaneously in different bands. The WLAN module may also include a radio which can be simultaneously active in more than one channel in one band and/or more than one band. Examples of clients that these WLAN modules may be used with include desktop computers, laptops, tablets, netbooks, work stations, cellular devices, televisions, entertainment centers, satellite communication devices, and other forms of computing devices.

Figure 1C:
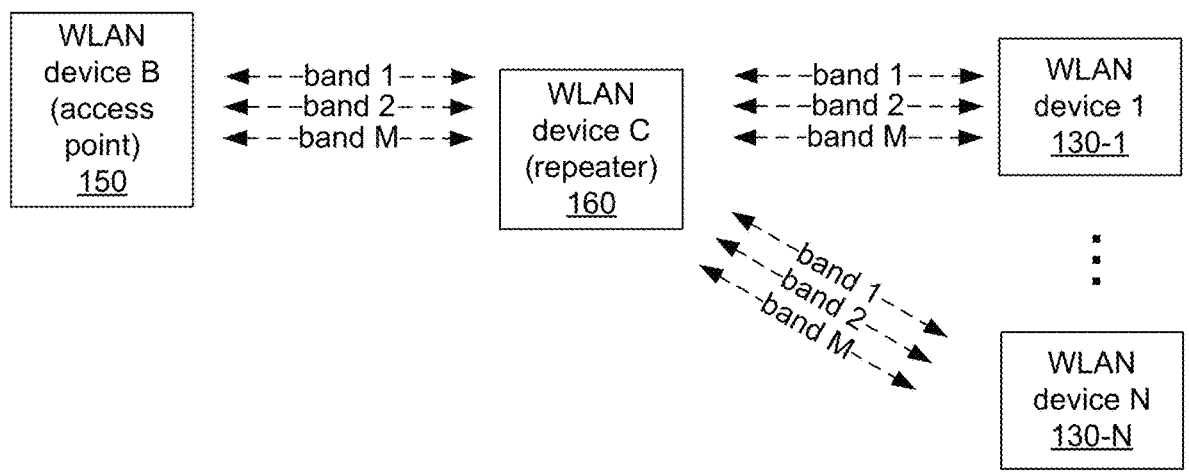
FIG. 1C is an illustration of an example system where a wireless device is used as a repeater, and the repeater communicates via one or more bands, consistent with various embodiments.

FIG. 1C is an illustration of an example system where a wireless device is used as a repeater, and the repeater communicates via one or more bands, consistent with various embodiments. Any of the WLAN devices depicted in FIG. 1C can be processing device 1000 of FIG. 10. Again, while only three bands, band 1, band 2, and band M, are shown, more than three bands can be used simultaneously by repeater 160 to communicate with the other wireless devices, such as wireless devices 130-1 . . . 130-N, or access point 150. To communicate simultaneously over multiple bands, in some embodiments, repeater 160 has a separate radio for each band, and in some embodiments, repeater 160 has more than one radio in one or more bands.

In the example of FIG. 1C, repeater 160 can act as a client to access point 150, while also acting as an access point to other WLAN devices, such as wireless devices 130-1 . . . 130-N. For example, access point 150 may have difficulty sending a message to wireless device 130-1, such as because wireless device 130-1 is out of the transmission range of access point 150, because wireless transmission noise is interfering with the transmission of access point 150 and preventing wireless device 130-1 from receiving the transmission, etc. In cases such as these, as well as in other cases, a repeater, such as repeater 160, can be used to facilitate communications between two WLAN devices, such as access point 150 and wireless device 130-1. Repeater 160 can pass messages from access point 150 to wireless device 130-1, and can pass messages from wireless device 130-1 to access point 150, thereby facilitating two way communication between access point 150 and wireless device 130-1.

FIG. 2 is an illustration of a representative wireless network environment within which some embodiments many be implemented, consistent with various embodiments. Environment 200 includes base stations 210a-b, network 220, a plurality of client devices 230a-230n, and other wireless devices 235a-b.

Base stations 210a-b, which are illustrated as operating in "access point (AP)" mode, are coupled with network 220 so that base stations 210a-b can enable client devices 230a-n to exchange data to and from network 220. For example, base station 210a or 210b and network 220 may be connected via a twisted pair cabling network, a coax cable network, a telephone network, or any suitable type of connection network. In some embodiments, base station 210a or 210b and network 220 may be connected wirelessly (e.g., which may include employing an IEEE 802.11 wireless network, or a data traffic network based on wireless telephony services such as 3G, 3.5G, 4G LTE and the like).

In some embodiments, base station 210a is connected to a different network than base station 210b. In one example base stations 210a-b are both operated by a company, and base stations 210a-b are both connected to the same corporate network. In a second example, base stations 210a-b are each operated by different companies. In this example, base station 210a is connected to the corporate network of the first company, and base station 210b is connected to the corporate network of the second company. The two corporate networks may both be connected to the Internet through, for example an Internet gateway at each of the two companies. The technologies supporting the communications between base stations 210a-b and network 220 may include Ethernet (e.g., as described in IEEE 802.3 family of standards) and/or other suitable types of area network technologies. Examples of different wireless protocols in the IEEE 802.11 family of standards can include IEEE 802.11a, IEEE 802.11b, IEEE 802.11n, IEEE 802.11ac, IEEE 802.11af, IEEE 802.11ah, IEEE 802.11ad, etc.

Although not shown for simplicity, base stations 210a-b may include one or more processors, which may be general-purpose processors or may be application-specific integrated circuitry that provides arithmetic and control functions to implement the techniques disclosed herein on base stations 210a-b. The processor(s) may include a cache memory (not shown for simplicity) as well as other memories (e.g., a main memory, and/or non-volatile memory such as a hard-disk drive or solid-state drive. In some examples, cache memory is implemented using SRAM, main memory is implemented using DRAM, and non-volatile memory is implemented using Flash memory or one or more magnetic disk drives. According to some embodiments, the memories may include one or more memory chips or modules, and the processor(s) on base station 210a or 210b may execute a plurality of instructions or program codes that are stored in its memory.

Client devices 230a-n can connect to and communicate with base station 210a or 210b wirelessly including, for example, using the IEEE 802.11 family of standards (e.g., WLAN), and can include any suitable intervening wireless network devices including, for example, base stations, routers, gateways, hubs, or the like. Depending on the embodiments, the network technology connecting between client devices 230a-n and base station 210a or 210b can include other suitable wireless standards such as the well-known Bluetooth communication protocols, near field communication (NFC) protocols, etc. In some embodiments, the network technology between client devices 230a-n and base station 210a or 210b can include a customized version of WLAN, Bluetooth, customized versions of other suitable wireless technologies, etc. Client devices 230a-n can be any suitable computing or mobile devices including, for example, smartphones, tablet computers, laptops, personal digital assistants (PDAs), or the like. Client devices 230a-n can include a display, and suitable input devices (not shown for simplicity) such as a keyboard, a mouse, or a touchpad. In some embodiments, the display may be a touch-sensitive screen that includes input functionalities. Additional examples of the client devices 230a-n can include network-connected cameras (or "IP cameras"), home sensors, and other home appliances (e.g., a "smart refrigerator" that can connect to the Internet).

Environment 200 can also include other devices, which may not be compatible with network 220, and which can be a source of interference for environment 200. For example, if a client, such as any of clients 230a-n, is connected to a home access point, and microwave oven 245b in the home is turned on, a connection to access point 210a or 210b over a 2.4 GHz band may deteriorate due to interference because microwave oven 235b has emissions in the 2.4 GHz band. Similarly, baby monitor 235a also operates on the 2.4 GHz band so baby monitor 235a is close to a client, such as any of clients 230a-n, or an access point, such as base station 210a or 210b, the connection is also likely to deteriorate. Bluetooth devices are another class of wireless devices that may be active in the 2.4 GHz band. Moreover, undesired electromagnetic interference may be emitted in the ISM bands from other devices in the home.

It is noted that one of ordinary skill in the art will understand that the components of FIG. 2 are just one implementation of a computer network environment within which present embodiments may be implemented, and the various alternative embodiments are within the scope of the present embodiments. For example, environment 200 may further include intervening devices (e.g., switches, routers, hubs, etc.) among base station 210a-b, network 220, and client devices 230a-n. In some examples, the network 220 comprises the Internet.

Figure 3:
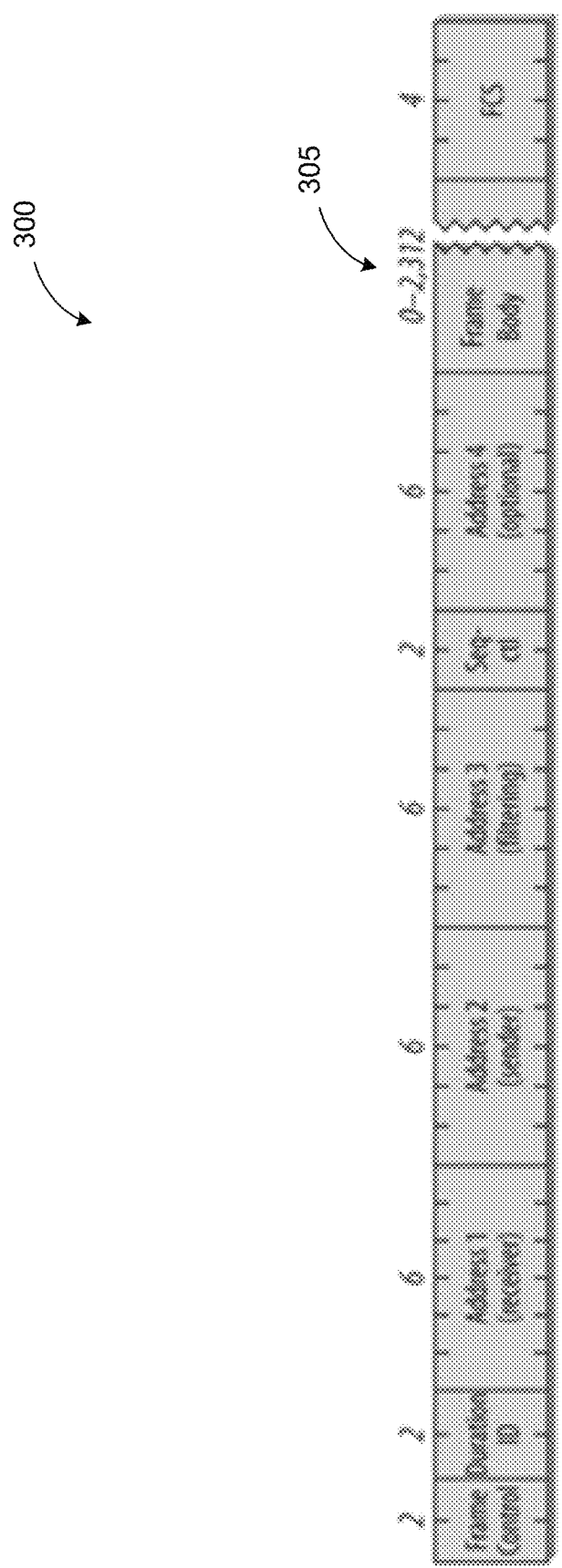
FIG. 3 is an illustration of the format of a frame of data, consistent with various embodiments.

FIG. 3 is an illustration of the format of a frame of data, consistent with various embodiments. Generic data frame 300 illustrates one format of a data frame of the IEEE 802.11 wireless networking standard. As can be seen, many of the fields of a frame of data are fixed format, such as Frame Control, which is 2 bytes, Duration ID, which is 2 bytes, etc. However, these fields tend to be smaller in size, ranging from 2 to 6 bytes in size and totaling 34 bytes in generic data frame 300. Of particular note is the Frame Body field, which is where the data being transmitted with the frame appears. The Frame Body field is a variable length field, ranging between 0 and 2,312 bytes in length. As can be clearly seen, the size of the Frame Body field can dramatically affect the size of a data frame.

Figure 4:
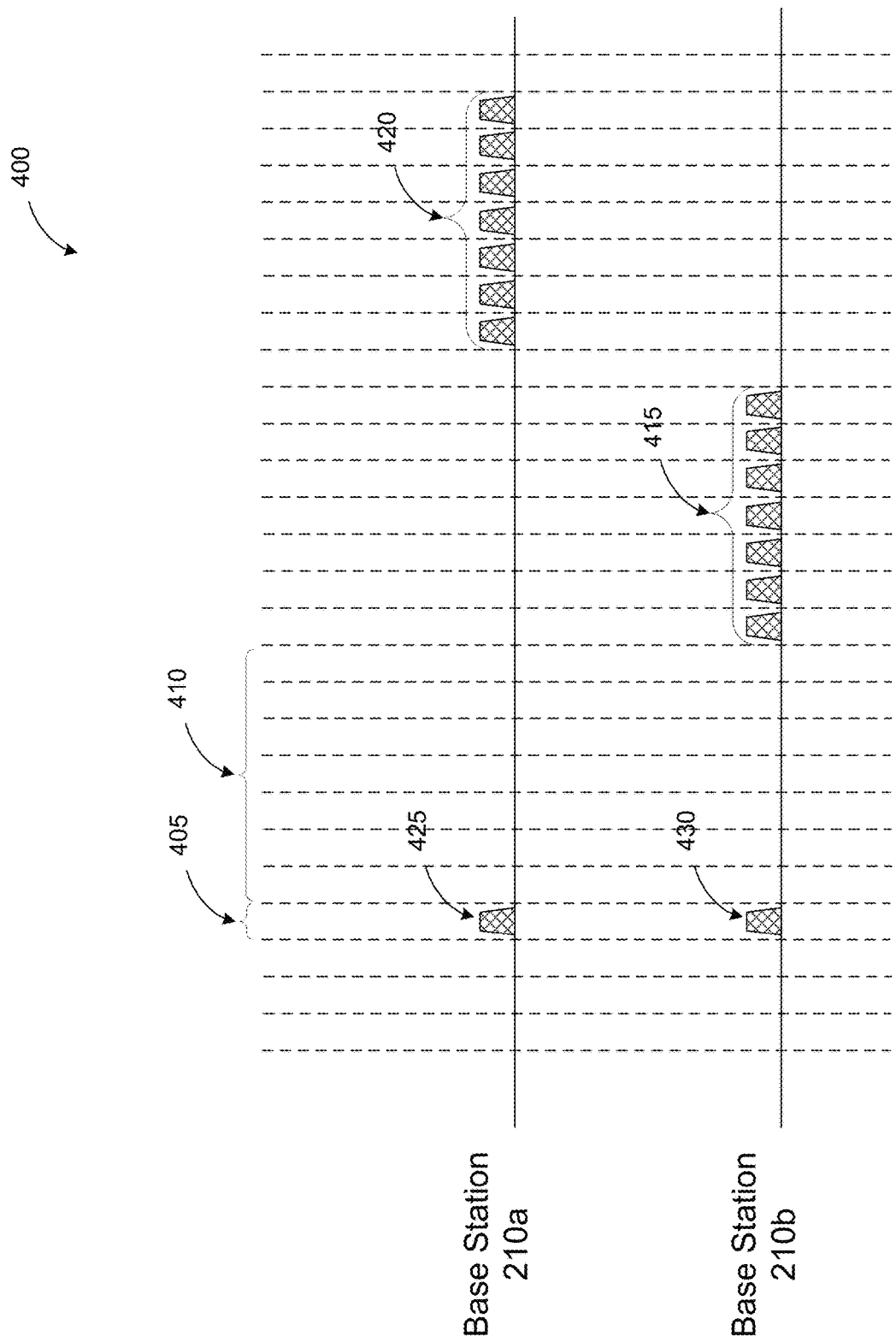
FIG. 4 is a timing diagram illustrating an example of contention between two wireless base stations, consistent with various embodiments.

FIG. 4 is a timing diagram illustrating an example of contention between two wireless base stations, consistent with various embodiments. FIG. 4 depicts communications involving base stations 210a and 210b of FIG. 2. In the example of FIG. 4, during time slot 405 base station 210a attempts to transmit data 425, and base station 210b attempts to transmit data 430. As a result, there is a data collision, which results in neither data 425 nor data 430 being properly received by their associated destination devices. To deal with such collision scenarios, the IEEE 802.11 standard includes a distributed coordination function (DCF) protocol, which is defined in subclause 9.3 of the IEEE 802.11 standard. DCF is a protocol which uses carrier sensing along with a four way handshake to optimize data throughput while minimizing packet collisions. DCF will be covered in more detail below. After waiting for backoff period 410, base station 210b transmits data 415. Base station 210a, sensing that the channel is now clear, transmits data 420.

Figure 5A:
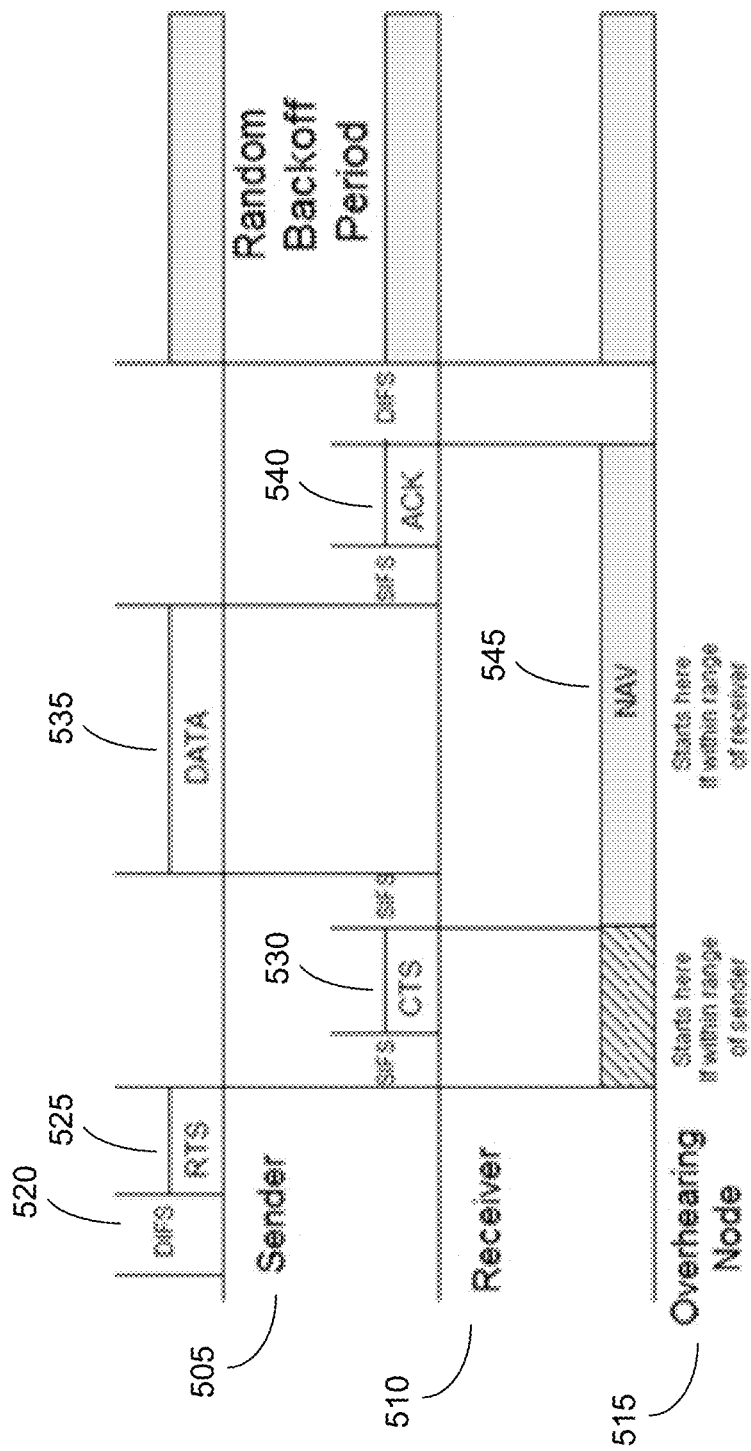
FIG. 5A is a timing diagram illustrating an example of a distributed coordination function (DCF) protocol, consistent with various embodiments.

FIG. 5A is a timing diagram illustrating an example of a DCF protocol, consistent with various embodiments. In the example of FIG. 5A, DCF requires sender 505, which wishes to transmit data, to "sense" the channel (to determine if another node is sending) for DCF Interframe Space (DIFS) interval 520. A channel can be deemed to be busy if an amount of energy detected on the channel is above a threshold, such as an energy detect (ED) threshold. If the channel is found busy during DIFS interval 520, sender 505 pauses the DIFS timer until the other node has finished transmitting. When multiple senders all wish to transmit data, and all of the senders "sense" the channel busy, they very likely will all sense that the channel is released at the same time. This could lead to all the senders trying to acquire the channel at the same time, resulting in yet more collisions. In order to avoid such collisions, DCF specifies a random backoff, which requires a sender to defer its attempt to acquire a channel for a random period of time.

When the backoff timer has expired, sender 505 will sense the channel to determine if there is another node transmitting. When the channel has been clear for some period of time, sender 505 will transmit request to send (RTS) signal 525 to the destination. The destination will respond (after a Short Interframe Space (SIFS), which is the time required to process a received frame and respond with a response frame) with clear to send (CTS) signal 530 if it is available to receive data. When the CTS signal is received by sender 505, sender 505 sends data 535 to receiver 510. In some embodiments, data is sent without exchanging RTS and CTS signals between the sender and the receiver. If receiver 510 successfully receives data 535, receiver 510 sends ACK 540 to sender 505 to acknowledge that the data was received successfully. ACK 540 is a frame or packet that communicates the value of ACK, whose value indicates whether the data was successfully received.

As an alternative to carrier sending, a network allocation vector (NAV) is also used to inform other nodes how long the current sender will need the channel. Along with the RTS and CTS, a NAV may be also transmitted. In the example of FIG. 5A, overhearing node 515 receives NAV 545 and knows that it does not need to sense the channel for the duration of NAV 545.

Some versions of the IEEE 802.11 standard, such as 802.11e, enhance DCF with a hybrid coordination function (HCF). Within the HCF, there are two methods of channel access, HCF Controlled Channel Access (HCCA) and Enhanced Distributed Channel Access (EDCA). Both EDCA and HCCA define traffic categories. For example, emails could be assigned to a lower priority class, while video could be assigned to a higher priority class. HCCA uses a central arbiter (access coordinator) that assigns the access/traffic categories for different types of packets. The central arbiter receives transmission requests from devices communicating in the 802.11 system so it can assign and coordinate transmission and tasks that are assigned to other devices.

EDCA is a medium access control (MAC) system used in, for example, the IEEE 802.11e WLAN system that enables assignment of priority levels to different types of devices or their applications. The prioritization can be enabled through the assignment of, e.g., different amounts of channel access back-off times where the amount of back-off time depends on the packet priority. When EDCA is in effect, higher-priority traffic has a higher chance of being sent than lower priority traffic. In some embodiments, this is accomplished through the Tiered Contention Multiple Access (TCMA) protocol, which is a variation of Carrier Sense Multiple Access with Collision Avoidance (CSMA/CA) using a shorter arbitration inter-frame space (AIFS) for higher priority packets. The levels of priority in EDCA are called Access Categories (ACs). The Contention Window (CW) can be set according to the traffic expected in each access category. Heavier traffic can require wider windows. Tables 805-815 of FIG. 8 list some EDCA parameters.[1] Table 805 covers calculation of contention window boundaries, table 810 covers default EDCA parameters for each AC, and table 815 covers how ACs map from Ethernet-level class of service priority levels.

[1] https://en.wikipedia.org/wiki/IEEE802.11e-2005

Some versions of the IEEE 802.11 standard, such as 802.11e and 802.11n, include frame aggregation. Frame aggregation combines multiple frames in a single transmission in order to increase throughput. Because each frame has overhead, such as packet headers, media access control (MAC) frame fields, interframe spacing, ACK, etc., aggregating frames to send in a single transmission can reduce this overhead, resulting in increased throughput. The 802.11n standard defines two types of frame aggregation, MAC Service Data Unit (MSDU) aggregation and MAC Protocol Data Unit (MPDU) aggregation. MSDU aggregation collects Ethernet frames to be transmitted to one or multiple destinations and transmits them in a single 802.11n frame. MPDU aggregation collects Ethernet frames to be transmitted to one or multiple destinations, and transmits them in a single 802.11n MAC header. While MPDU is generally less efficient than MSDU aggregation, MPDU may be more efficient in environments with interference and associated higher error rates because of a mechanism called block acknowledgement, which enables each of the aggregated data frames to be individually acknowledged or retransmitted is not successfully received.

Figure 5B:
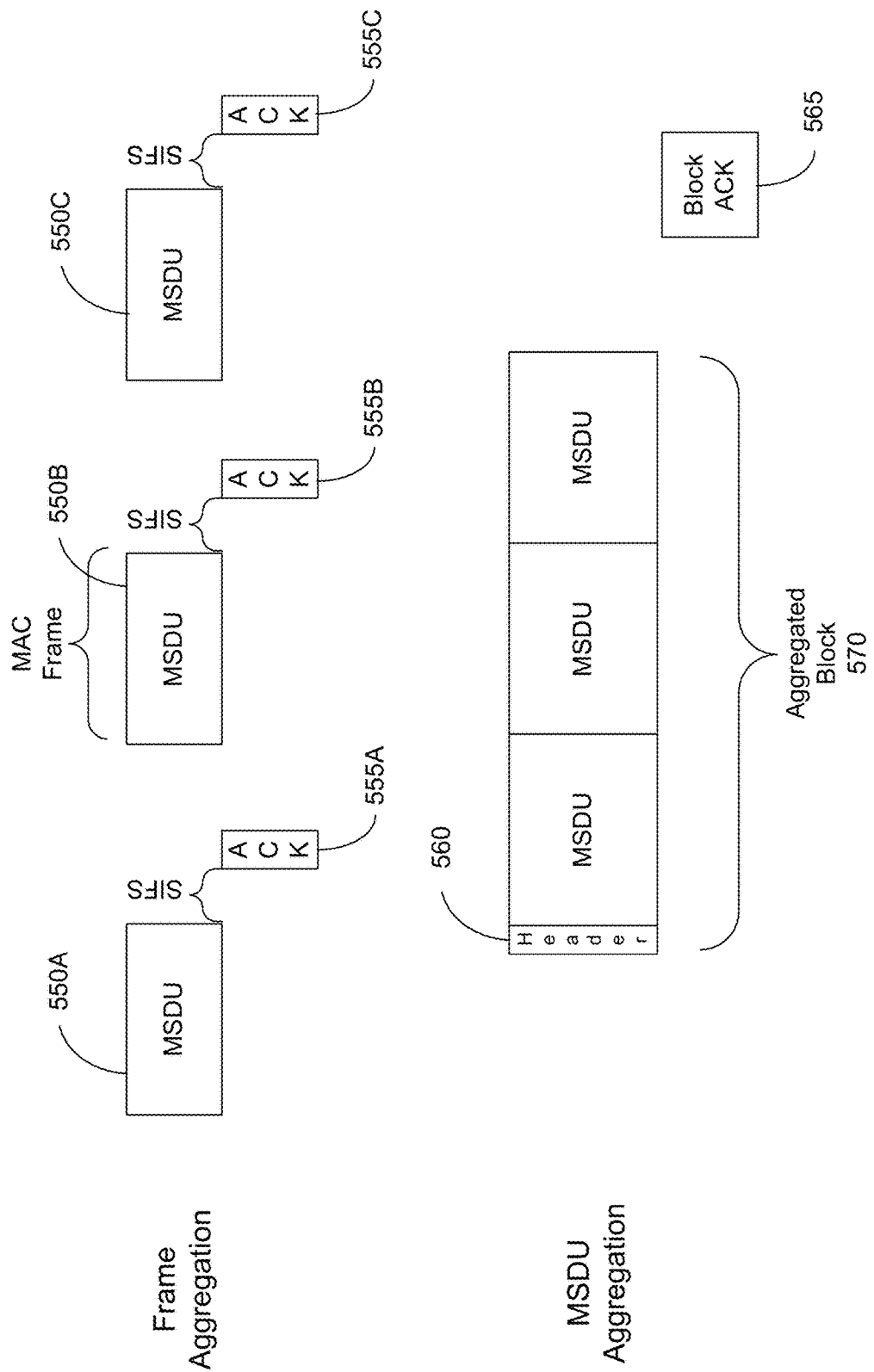
FIG. 5B is an illustration of MSDU Aggregation, consistent with various embodiments.

Some versions of the IEEE 802.11 standard, such as 802.11n and 802.11ac, support aggregation of MPDU and MSDU blocks. The example of FIG. 5B is an illustration of MSDU block aggregation, consistent with various embodiments. For example, MPDU blocks can be aggregated during block aggregation by utilizing Aggregated MAC Protocol Data Unit (AMPDU), and MSDU blocks can be aggregated during block aggregation by utilizing Aggregated MAC Protocol Service Unit (AMPSU). AMPDU and AMPSU aggregation are analogous, with AMPSU aggregation being represented in FIG. 5B. As discussed above, frame aggregation combines multiple frames into a single transmission, such as MSDU block 550A, B, or C. Each MSDU block is a single transmission, and each transmission is acknowledged with an ACK, as is represented by ACK 555A, B, and C. For block aggregation, such as AMPSU or AMPDU, multiple blocks, such as MSDU or MPDU blocks, are combined into a single transmission. In FIG. 5B, MSDU blocks 550A-C are combined into Aggregated Block 570, which is transmitted as a single transmission, such as by being transmitted as a single MAC Frame. Because management information, such as header information, needs to be specified only once per transmission, the ratio of payload data to the total volume of data is higher with block aggregation, often resulting in higher throughput.

The maximum size of block aggregation can be negotiated in initial connection setup between two WLAN devices (e.g., during client association). After initial connection between two WLAN devices, either WLAN device can utilize AMPDU or AMPSU to maximally or optimally aggregate blocks to obtain maximum throughput, maximum efficiency, etc. In some examples, the amount of aggregation to create an aggregated block is dependent on any of various factors, such as the volume of data traffic, the number of packets in the WLAN device buffer, the link rate, etc. While frame or block aggregation may be efficient in a low transmission noise environment, it may not be optimal in some interference environments. For example, electronic interference at 2.4 GHz or 5 GHz, or electronic interference above a predetermined threshold, may reduce the transmission efficiency, throughput, etc. for a WLAN device.

In an environment with electronic interference that occurs more frequently, such as electronic interference above a predetermined duty cycle, the likelihood of collision can increase as the size of the aggregated block increases. As a result, a transmission of an aggregated block may not be received at all, or only a portion of the aggregated block may be received. Moreover, interference may result in poor channel estimation, timing, and carrier recovery during preamble processing at the beginning of the transmission.

When preamble processing is done in an environment with electronic interference, the likelihood of a WLAN device successfully receiving the aggregated block is reduced due to the increased likelihood of part or all of the aggregated block being lost due to electronic interference. As previously discussed, the increased likelihood of some or all of the aggregated block not being received results from the large size of the aggregated block, as a larger aggregated block requires an environment free from excessive electronic interference for a longer period of time than does a smaller aggregated block. For example, a WLAN device may receive the first few symbols of an aggregated block successfully, but may not receive the rest of symbols due to electronic interference that materializes during the transmission of the aggregated block. In some examples, a WLAN device may renegotiate the maximum size of block aggregation after repeated attempts to send aggregated blocks are unsuccessful.

To increase transmission throughput or efficiency in an environment with electronic interference, some embodiments advantageously vary the size of block aggregation depending on any of various parameters, such as the amount of interference, type of interference, WLAN device transmitter capabilities, WLAN device receiver capabilities, etc. A WLAN device can advantageously vary the size of block aggregation without renegotiating the maximum size of block aggregation with a receiving WLAN device, thereby saving the time and energy needed to accomplish the renegotiation.

A transmitting WLAN device is in control of the size of an aggregated block, as long as the size remains within the range of the maximum aggregated block size that was negotiated in initial link setup. Therefore, when a transmitting WLAN device detects electronic interference, or when a receiving WLAN device detects electronic interference and notifies the WLAN transmitting device, the transmitting WLAN device can reduce the size of the transmission unit to optimize or maximize transmission in the presence of the electronic interference. This optimization or maximization can be done in any of various ways, such as by trial and error or experimentation where the transmitter changes the size of the transmission unit and measures any of various parameters, such as the transmission error rate, the throughput, etc. The WLAN device can use an aggregated block size that optimizes or maximizes any of various parameters, such as transmission throughput, transmission delay, transmission efficiency, etc.

Figure 5C:
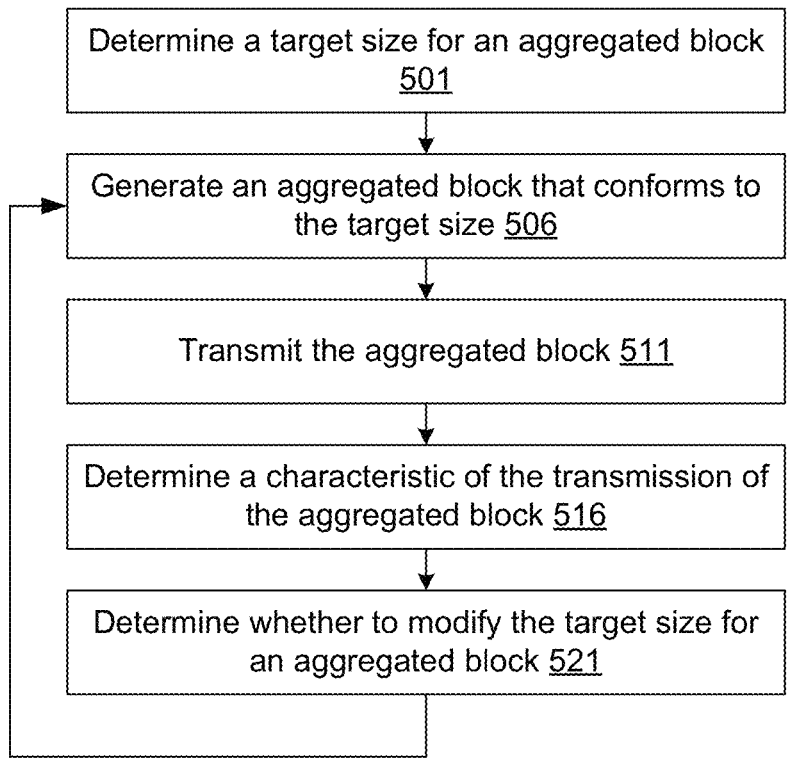
FIG. 5C is a flow diagram that illustrates a method for improving wireless communication by adjusting a target size of an aggregated block, consistent with various embodiments.

FIG. 5C is a flow diagram that illustrates a method for improving wireless communication by adjusting a target size of an aggregated block, consistent with various embodiments. At block 501, a transmitting WLAN device determines a target size for an aggregated block that the WLAN device will transmit to a receiving WLAN device. During initial connection setup between the transmitting WLAN device and the receiving WLAN device, a range of allowable sizes for an aggregated block was negotiated, and the target size is within this negotiated range. At block 506, the transmitting WLAN device aggregates multiple blocks to generate an aggregated block, such as Aggregated Block 570 of FIG. 5B, that conforms to the target size. At block 511, the transmitting WLAN device transmits the aggregated block to the receiving WLAN device.

In some embodiments, the receiving WLAN device detects a data transmission that is not destined for the receiving WLAN device. In an example, the transmitting and receiving WLAN devices are part of a WLAN of a first business, and a neighboring business in the same building has its own WLAN. The WLANs of the first and the neighboring businesses happen to overlap at the location of the receiving WLAN device, so the receiving WLAN device receives data transmissions from both WLANs. In some cases the receiving WLAN device simultaneously receives data transmissions from the WLANs of the first business and the neighboring business. When multiple data transmissions are detected, the receiving WLAN device determines which data transmission has higher power, and prioritizes receiving the data of the higher power data transmission. In some cases, the power of the data transmission of the neighboring business' WLAN is higher than the power of the data transmission of the first business' WLAN.

In some cases when the receiving WLAN device detects multiple data transmissions, the receiving WLAN device prioritizes receiving the higher power data transmission. The receiving WLAN device receives the entire data transmission from the WLAN of the neighboring business, and stores the data in a buffer or other memory. After receiving the entire data transmission, the receiving WLAN device parses the data of the data transmission, and determines that the data transmission was not addressed to the receiving WLAN device. Having determined that the data transmission was not intended for the receiving WLAN device, the receiving WLAN device discards the data of the data transmission. Because the receiving WLAN device was busy receiving the data transmission from the WLAN of the neighboring business, it was not able to receive the data transmission of the first business.

In some embodiments, the receiving WLAN device advantageously stops receiving the data transmission before the entirety of the data of the data transmission is received, freeing up the receiving WLAN device to receive the data transmission of the first business. For example, as data from the data transmission from the WLAN of the neighboring business is being received, the receiving WLAN device stores the received data in a buffer or other memory. A processor of the WLAN device parses the data of the data transmission in real time (e.g., as the data of the data transmission is being received), and determines that the data transmission is not addressed to the receiving WLAN device. The processor, based on the data transmission not being addressed to the receiving WLAN device, causes the receiving of the data of the data transmission to be halted. Because the receiving WLAN device is no longer busy receiving the data transmission of the WLAN of the neighboring business, the receiving WLAN device can now receive the data transmission of the WLAN of the first business.

At block 516, the transmitting WLAN device determines a characteristic of the transmission of the aggregated block of block 511. The characteristic can be any of various characteristics. In an example, the characteristic is a data transmission error rate. The receiving WLAN device determines which blocks of the aggregated blocks were successfully received, and sends a block ACK to the transmitting WLAN device, which identifies which blocks were successfully received and which were not. Based on the block ACK, the transmitting WLAN device determines the data transmission error rate. When the rate is above a first predetermined threshold, such as 50%, the transmitting WLAN device determines to modify the target size of an aggregated block (block 521), such as by reducing the target size. When the error rate is below a second predetermined threshold, such as 10%, the transmitting WLAN device determines to increase the target size (within the negotiated range of allowable sizes for an aggregated block). When the error rate is between the first and second predetermined thresholds, the transmitting WLAN device determines to keep the target size for an aggregated block the same. The predetermined thresholds can be chosen in any of various ways, such as based on trial and error or experimentation, and the predetermined thresholds can have some overlap or hysteresis. The transmitting WLAN device generates an aggregated block that conforms to the target size (block 506), where the target size can be the modified target size determined at block 521.

In another example, the characteristic of the transmission of the aggregated block is a data transmission delay. The transmitting WLAN device determines a data transmission delay associated with the transmission of the aggregated block. The determination of the delay can be based on data received by the transmitting WLAN device from the receiving WLAN device, such as data related to the transmission of the aggregated block. Based on the determination of delay, the transmitting WLAN device determines whether to modify the target size of an aggregated block (block 521), such as by reducing or increasing the target size.

In yet another example, the characteristic of the transmission of the aggregated block is a characteristic of electronic interference. The transmitting WLAN device, or any other WLAN device, determines a characteristic of observed electronic interference. For example, the characteristic of the electronic interference can be the detected energy of the electronic interference, the type of the electronic interference (e.g., Bluetooth, 2.4 Ghz, 5 Ghz, etc.), observed duration(s) of the electronic interference, observed frequency of occurrence of the electronic interference, etc. When a WLAN device other than the transmitting WLAN device determines a characteristic of observed electronic interference, the WLAN device can send information related to the characteristic to the transmitting WLAN device. The transmitting WLAN device can determine the characteristic of observed electronic interference based on the information received from the WLAN device. Based on the characteristic of the electronic interference, the transmitting WLAN device determines whether to modify the target size of an aggregated block (block 521), such as by reducing or increasing the target size. For example, based on previous trial and error or other experimentation, a WLAN device can know how to modify the target size of an aggregate block in order to optimize or maximize transmission of the aggregated block in the presence of certain types of electronic interference.

In another example, the characteristic of the transmission of the aggregated block is any of various parameters of the transmitting or receiving WLAN devices. For example, parameters of the transmitting or receiving WLAN devices can include the transmitter/receiver capabilities, such as the number of transmit antennas of the transmitting WLAN device or the number of receive antennas of the receiving LAN device, the transmission channel coding, the modulation types that the receiving WLAN device supports, the transmit power of the transmitting WLAN device, the receive sensitivity of the receiving WLAN device, etc. Based on a parameter of the transmitting or receiving WLAN device, the transmitting WLAN device determines whether to modify the target size of an aggregated block (block 521), such as by reducing or increasing the target size. For example, based on previous trial and error or other experimentation, a WLAN device can know how to modify the target size of an aggregate block in order to optimize or maximize transmission of the aggregated block when a selected parameter of the transmitting or receiving WLAN device has a certain setting/characteristic/value/etc.

Figure 5D:
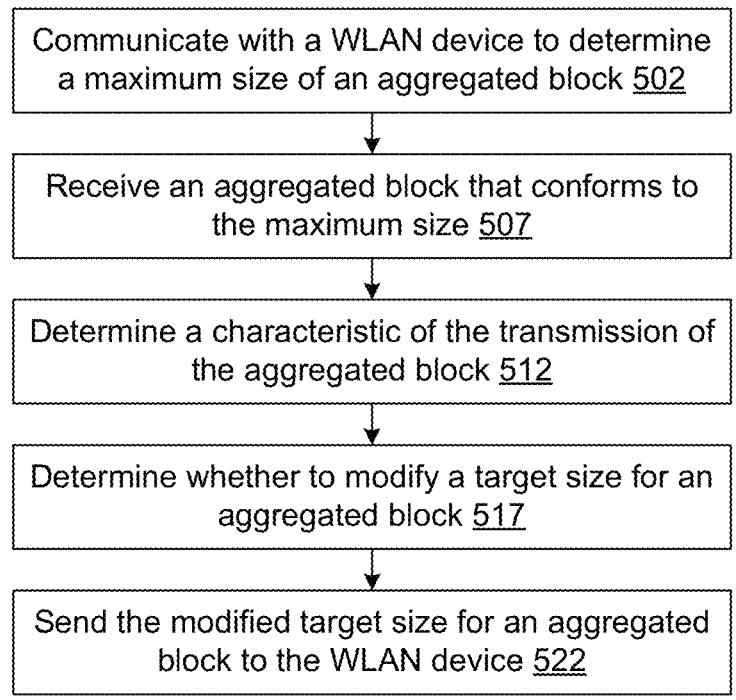
FIG. 5D is a flow diagram that illustrates a method for improving wireless communication where a receiving WLAN device sends a modified target size of an aggregated block to a transmitting WLAN device, consistent with various embodiments.

FIG. 5D is a flow diagram that illustrates a method for improving wireless communication where a receiving WLAN device sends a modified target size of an aggregated block to a transmitting WLAN device, consistent with various embodiments. At block 502, two WLAN devices, such as a transmitting WLAN device and a receiving WLAN device, communicate to determine a maximum size of an aggregated block. This communication can happen, for example, during initial connection setup between the transmitting WLAN device and the receiving WLAN device, or during a renegotiation of parameters of the initial connection setup. At block 507, the receiving WLAN device receives an aggregated block that conforms to the maximum aggregated block size. At block 512, the receiving WLAN device determines a characteristic of the transmission of the aggregated block. The characteristic of the transmission of the aggregated block can be substantially similar to any of the characteristics discussed at block 516 of FIG. 5C.

For example, the characteristic can be a data transmission error rate, a characteristic of electronic interference, etc. At block 517, the receiving WLAN device determines whether to modify a target size for an aggregated block. For example, the receiving WLAN device can determine to increase or decrease the target size for an aggregated block, such as based on the characteristic of the transmission of the aggregated block. At block 522, the receiving WLAN device sends the modified target size for an aggregated block to the transmitting WLAN device. The method of FIG. 5D can be advantageous in some scenarios. For example, when a receiving WLAN device can adequately measure or otherwise characterize electronic interference, and when the transmitting WLAN device is not able to adequately measure or otherwise characterize the electronic interference, the receiving WLAN device may be in a better position to determine whether to modify the target size. The receiving WLAN device can determine a modified value for the target size. At block 522 the receiving WLAN device sends the modified target size for an aggregated block to the transmitting WLAN device, where the transmitting WLAN device receives the modified target size and generates and transmits an aggregated block that conforms to the modified target size.

The IEEE 802.11 standard allows two WLAN devices to renegotiate one or more parameters negotiated during initial connection setup, such as by the transmission of a DELBA (Delete Block ACK) frame which terminates a previously operating Block ACK setup between the two WLAN devices. However, the standard does not enable a receiving WLAN device to send a message to a transmitting WLAN device to cause the transmitting WLAN device to dynamically change the size of aggregated blocks that the transmitting WLAN device sends, and that the receiving WLAN device subsequently receives. The method of FIG. 5D advantageously enables a receiving WLAN device to dynamically change the size of an aggregated block that a transmitting WLAN device sends, and that the receiving WLAN device subsequently receives, without having to renegotiate any of the parameters of the initial connection setup.

Returning to the timing diagram of FIG. 5A, wireless transmissions can have one or more associated rate control parameters, which can control or affect the rates at which frames or packets are transmitted. For example, a data rate parameter can control or affect the data rate at which a data frame or packet, such as data frame 300 of FIG. 3, is transmitted. An ACK data rate parameter can similarly control or affect the data rate at which an ACK frame or packet, such as ACK 540, is sent. Because an ACK frame or packet includes an ACK value, which is a short fixed length value, but does not include any of the data being transmitted, an ACK frame does not include a variable frame body, such as frame body 305 of FIG. 3. As a result, the maximum transmission time of an ACK frame is much shorter than the maximum transmission time of a data frame, such as data frame 300 of FIG. 3, which can have a frame body 305 of as many as 2,312 bytes. Consequently, an ACK frame can be transmitted at a slower data rate than a data frame, and can still be transmitted in less time than the maximum transmission time of the data frame at the higher data rate.

Transmitting an ACK frame at a lower data rate typically enables higher reliability transmission of ACK due to the lower data rate transmission being more tolerant of interference, such as interference that affects the Signal to Noise Ratio (SNR). In some embodiments, a data rate parameter and an ACK rate control parameter can be set to different data rates, which can be independent of each other. Other frame/packet types, such as network management, control packets (such as RTS, CTS, ACK, etc.), can have associated rate control parameters, which can control or affect the rates at which the associated frame or packet types are transmitted. Further, in some embodiments, each of the rate control parameters can be independent of the other rate control parameters.

In some embodiments, a transmitting WLAN device changes a transmission data rate to optimize or maximize a data transmission parameter, such as data transmission throughput. For example, the transmitting WLAN device can use trial and error or other experimentation while varying the data rate to determine a transmission data rate that optimizes or maximizes/minimizes a data transmission parameter. Examples of data transmission parameters include a transmission data rate, a transmission error rate, such as a packet error rate (PER), a data transmission delay, etc. The trial and error or experimentation can include varying the transmission data rate, monitoring a transmission parameter that results from the varying of the transmission data rate, and determining a transmission data rate that optimizes or maximizes/minimizes the data transmission parameter. For example, a user may want to maximize a transmission data rate, may want to minimize a transmission error rate, may want to minimize a data transmission delay, etc.

In an example, a transmitting WLAN device monitors PER of data transmissions. The transmitting WLAN device determines a PER observed by a receiving WLAN device based on PER data that the receiving WLAN device sends to the transmitting WLAN device. When the PER is below a certain predetermined threshold, such as 10%, the transmitting WLAN device increases the data transmission rate. When the PER is above a certain threshold, such as 50%, the transmitting WLAN device reduces the transmission data rate. Such a method often works if the primary cause of the transmission errors is an insufficient Signal to Noise Ratio (SNR). Lowering a data transmission rate can result in a lower SNR requirement being required in order to successfully receive data transmitted at the lower rate.

However, in some cases when the primary or a significant source of transmission errors is packet collisions, reducing the transmission data rate can actually increase the PER, due to increased collisions that result from the longer amount of time that it takes to send a fixed amount of data. In an environment with significant packet collisions, one way to avoid the collisions is to reduce the duration of individual data transmissions, such as by reducing the size (e.g., the number of bytes) of an individual data transmission, by increasing the data rate of an individual data transmission, etc. An individual data transmission can include, for example, sending one packet of data, one frame of data, one block of data, etc. If the size of the individual data transmission is reduced, and the data is sent at a constant data transmission rate, then the duration that it takes to send the individual data transmission will be reduced, resulting in a lower chance of a data collision. If the size of an individual data transmission is kept constant, and the data transmission rate is increased, then the duration that is takes to send the individual data transmission can be similarly reduced. For example, when a SNR is sufficient to support an increased data transmission rate, then the duration that it takes to send the individual data transmission may be reduced.

In some embodiments, when an amount of electronic interference is below a first predetermined threshold, a transmitting WLAN device changes a data transmission rate proportionally to a change in PER observed at a receiving WLAN device. In an example, when an amount of electronic interference is below a first predetermined threshold, such as when an amount of energy detected on a transmission channel is below a first energy threshold, and when the PER increases by D percent, the transmitting WLAN device reduces the data transmission rate by k*D, where k can be optimized based on increasing data transmission throughput, based on achieving a target PER, based on reducing a data transmission duration, where k can be the number 1, etc. When an amount of electronic interference is above a second predetermined threshold, such as when an amount of energy detected on a transmission channel is above a second energy threshold, and when the PER increases by D percent, the transmitting WLAN device reduces the data transmission rate by (k*D)/(1+Y), where Y is a function of the amount of electronic interference detected.

Additionally, when a transmission error rate, such as PER, is below a threshold that is a function of the electronic interference, the transmitting WLAN device of the example increases the data transmission rate by an amount that is a function of the electronic interference. For example, when PER is below H*(1+Z), where H is a constant error rate, such as 10%, and Z is a function of the electronic interference, such as a function that increases when the electronic interference increases, the transmitting WLAN device increases the data transmission rate. Z can be a function of the electronic interference that monotonically increases as the electronic interference increases. As Z increases when the electronic interference increases, by changing the data transmission rate when PER is below H*(1+Z), the threshold PER that triggers an increase in data transmission rate is reduced as the electronic interference increases.

In some embodiments, a WLAN device transmits a wireless signal in all directions, such as via an omnidirectional antenna. In other embodiments, such as in some IEEE 802.11ac WLAN devices, a WLAN device can transmit a wireless signal so as to focus energy towards one or more receivers, such as via beamforming. In yet other embodiments, a WLAN device can vary transmission between omnidirectional and beamforming, among others. When a WLAN device has sufficient information to locate a receiver and send radio energy preferentially in the direction of the receiver, such as via a beamforming technique, it is possible in some cases to extend the range of transmission, and to overcome certain levels of interference.

Figure 6:
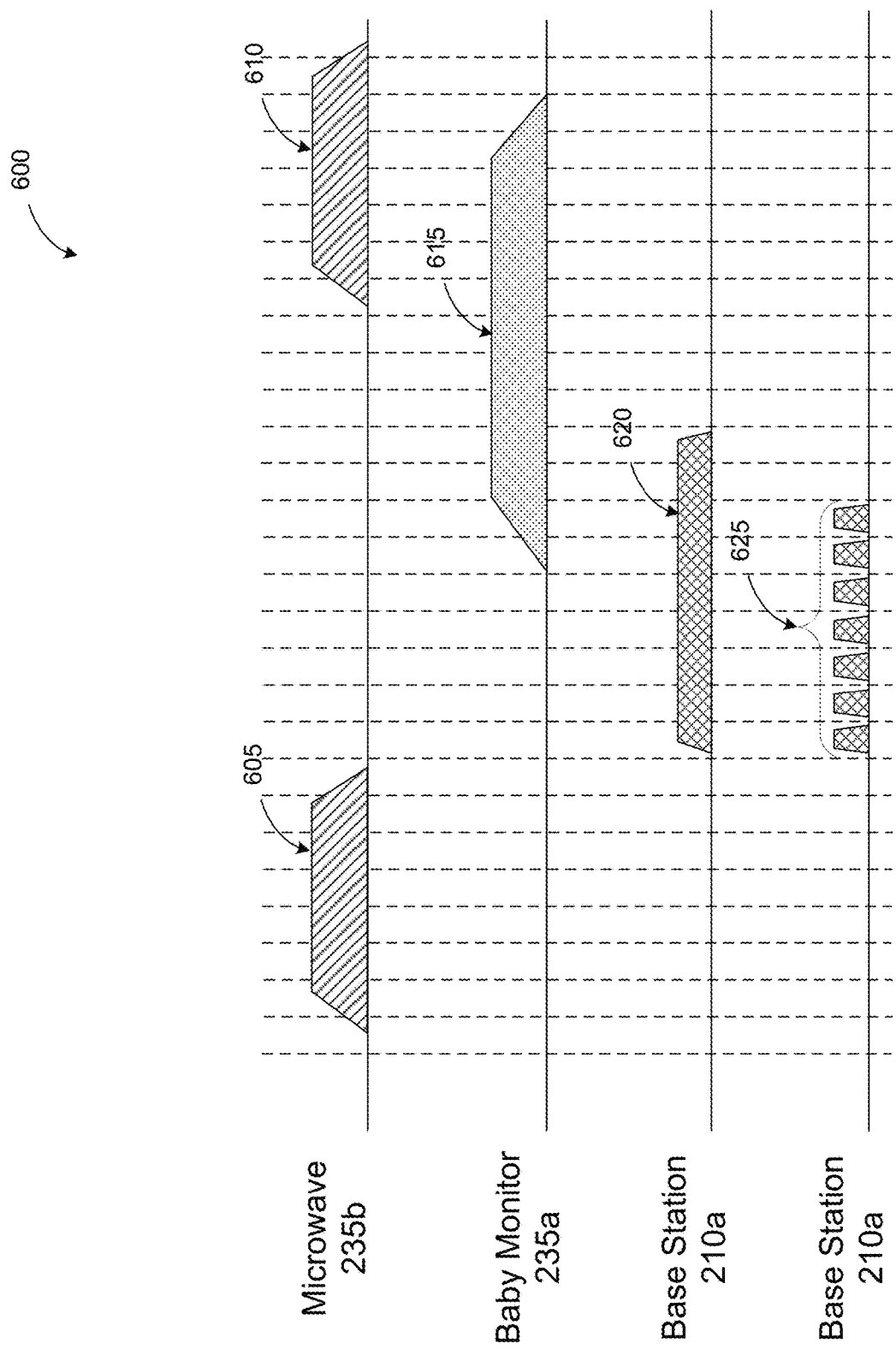
FIG. 6 is a timing diagram illustrating an example of a wireless base station attempting to transmit data between interference signals, consistent with various embodiments.

FIG. 6 is a timing diagram illustrating an example of a wireless base station attempting to transmit data between interference signals, consistent with various embodiments. Timing diagram 600 depicts microwave 235b of FIG. 2 emitting electromagnetic signals 605 and 610, which cause interference for base station 210a. Timing diagram 610 also depicts baby monitor 235a of FIG. 2 emitting electromagnetic signal 615, which also causes interference for base station 210a. In a first example, base station 210a senses the channel to determine when the channel is clear. Once the channel is clear, base station 210 transmits frame 620. Frame 620 happens to have the maximum frame body size of 2312 bytes. As a result, the time that it takes to transmit frame 620 is extended, resulting in electromagnetic signal 615 interfering with the transmission of frame 620. As a result, frame 620 is not successfully sent.

In a second example, base station 210a senses the channel to determine when the channel is clear. Once the channel is clear, base station 210 transmits frames 625. Each frame of frames 625 has a frame body of 128 bytes. As a result, the time that it takes to transmit each frame of frames 625 is reduced, resulting in most of the frames of frames 625 being successfully sent before electromagnetic signal 615 interferes with the transmission of one of the frames of frames 625.

Error rates can be used to characterize the quality of a wireless data channel. Generally, the higher the error rate, the lower the quality of wireless data transmission over a channel, and the lower the error rate, the higher the quality of wireless transmission over a channel. Interference will often increase the error rate associated with a channel, resulting in lower quality transmission of wireless data. Two measures of error rates for the IEEE 802.11 standard are packer error rate (PER) and bit error rate (BER). BER can be calculated by dividing the number of bits received in error by the total number of bits transmitted. The IEEE 802.11 standard defines a method for sensing the BER of a data link, which may be obtained from signal to noise and interference ratio. PER can be calculated by dividing the number of packets successfully received by the total number of bits transmitted. Interference generally degrades the quality of wireless transmission, resulting in a higher BER and PER.

FIG. 7 is a table listing modulation and coding scheme (MCS) parameters, consistent with various embodiments. Table 700 lists MCS parameters, such as MCS index values, associated spatial streams, modulation types, coding rates, etc. Multiple-input multiple-output (MIMO) technology is a technology that uses multiple antennas to coherently resolve more information than is generally possible using a single antenna, enabling transmission of multiple streams of data in a given frequency space. The data transmission can be MIMO, such as single-user MIMO (SU-MIMO). SU-MIMO transmission can support multiple stream of data being transmitted between, e.g., a Wi-Fi transmitter and multiple devices. Each stream can be from a single multi-antenna transmitter to/from a single multi-antenna receiver, with the Wi-Fi transmitter taking turns sending or receiving data to/from each device. Multi-user MIMO (MU-MIMO) technology was developed to enhance MIMO systems when there are multiple users or connections. MU-MIMO can leverage multiple users are spatially distributed transmission resources, at the cost of somewhat more expensive signal processing. This enables, for example, a Wi-Fi transmitter to simultaneously transmit or receive data to/from each of the multiple devices to which the transmitter is streaming.

MIMO technology may leverage Spatial Division Multiplexing (SDM) to enable these multiple streams in a frequency space that may have been previously used for one stream of data. The spatial streams column of table 700 identifies how many streams of data can be transmitted in a given frequency space, for example, with the IEEE 802.11n or 802.11ac standards. While table 700 shows values of 1-4 for the number of spatial streams, the number of streams can be higher. For example, the 802.11ac standard allows up to 8 streams of data. As can be seen in the table, increasing the number of spatial streams enables more data to be transmitted in a given frequency space. For example, with an MCS index of 0, the 20 Mhz channel 800 ns GI data rate is 6.5 Mbit/s, while with an MCS index of 24, the 20 Mhz channel 800 ns GI data rate is 25 Mbit/s, or 4 times higher. This is due to the number of streams being increased from 1 spatial stream with the MCS index of 0 to 4 spatial streams with the MCS index of 24.

The modulation type column of table 700 identifies the method by which data is communicated over the air. The more complex the modulation, the higher the data rate, and the less interference that can be tolerated. The coding rate column of table 700 indicates how much of the data stream is being used to transmit usable data. For example, MCS index value 0 has a coding rate of ½, which indicates that about 50% of the data stream is being used. The guard interval (GI) values from table 700 indicate how long of a pause is inserted between packet or frame transmission to allow for any false information to be ignored. Shorter GIs can generally tolerate less interference that longer GIs. Table 700 shows data rates for GI values of 800 ns and 400 ns with 20 Mhz and 40 Mhz channels. Table 700 includes data rates for two channel widths, 20 Mhz and 40 Mhz. A wireless network can use channel widths other than 20 Mhz or 40 Mhz.

Figure 9:
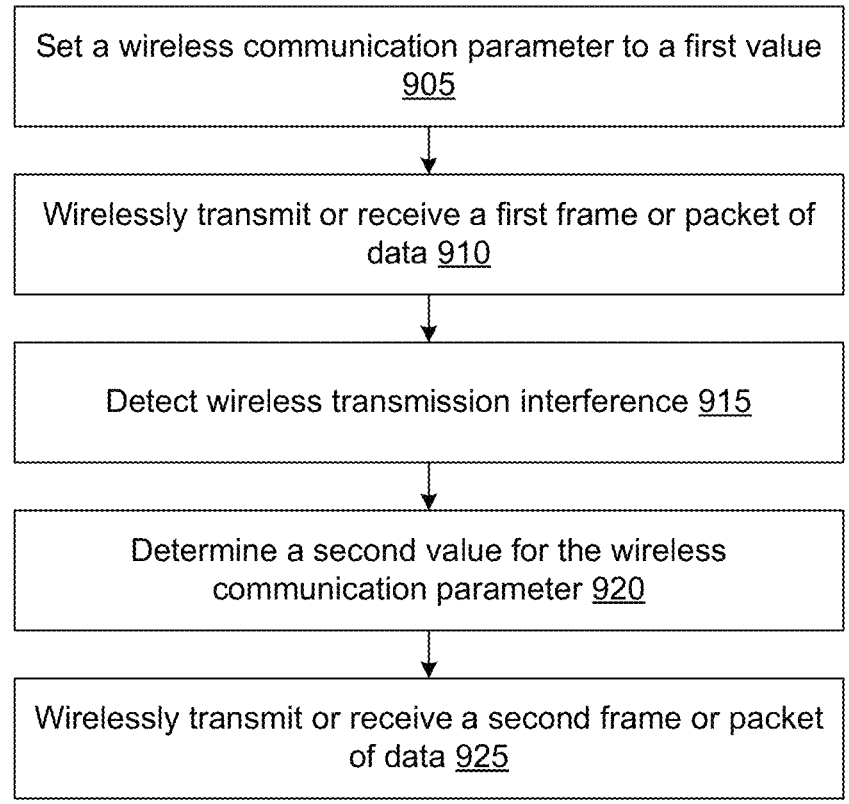
FIG. 9 is a flow diagram that illustrates a method for improving wireless communication of data in an environment of electromagnetic interference, consistent with various embodiments.

FIG. 9 is a flow diagram that illustrates a method for improving wireless communication of data in an environment of electromagnetic interference, consistent with various embodiments. At block 905, a first WLAN device sets a wireless communication parameter to a first value. Examples of wireless communication parameters include: a parameter that controls or affects the size of a frame or packet; a parameter that controls or affects MCS, such as a parameter that limits MCS to a predetermined range; a parameter that controls or affects a transmission rate, such as a rate control parameter that controls or affects a data rate at which an ACK, RTS, or CTS frame or packet is transmitted, or a rate control parameter that controls or affects a data rate at which a data, network management, or control frame or packet is transmitted; a parameter that controls or affects EDCA, such as a parameter that controls or affects prioritization of frames or packets of data; a parameter that controls or affects an ED threshold; a parameter that controls or affects aggregation, such as a parameter that controls whether an MSDU, MPDU, AMPDU, or AMPSU aggregation algorithm is used during wireless transmission of frames or packets or blocks of data; a parameter that controls or affects a size of an aggregated block, such as aggregated block 570 of FIG. 5B; a parameter that controls or affects RTS/CTS, such as a parameter that controls whether an RTS/CTS protocol is used during wireless transmission of frames or packets of data; a parameter that controls or affects beamforming, such as a parameter that controls whether beamforming is used during wireless transmission of frames or packets of data; a parameter that controls or affects MU-MIMO, such as a parameter that controls whether a MU-MIMO protocol is used during wireless transmission of frames or packets of data; a parameter that controls or affects whether a WLAN device changes etc. The above listed parameters are just examples of wireless communication parameter. Any parameter that can control or affect a wireless communication can be a wireless communication parameter, and many such parameters, including some which do not appear in the above list of parameters, are discussed throughout this specification.

At block 910, the first WLAN device wirelessly transmits or receives a first frame, packet, or block of data. The data of the frame or packet is a binary signal or value that contains information. The transmission or reception can be to/from any of various WLAN devices, such as a laptop computer, a tablet computer, a mobile device, a desktop computer, a printer, an access point, a base station, a repeater, etc. In some embodiments, the first WLAN device wirelessly transmitting or receiving a first frame, packet, or block of data includes wirelessly receiving and transmitting the first frame, packet, or block of data. For example, when the first WLAN device is a repeater, such as repeater 160 of FIG. 1C, the repeater can wirelessly receive the first frame, packet, or block of data from a WLAN access point, such as access point 150, and can wirelessly transmit the first frame, packet, or block of data to a WLAN client, such as wireless device 130-1.

At block 915, a WLAN device, such as the first WLAN device or any other WLAN device that can communicate with the first WLAN device, detects wireless transmission interference. The wireless transmission interference can come from any of various sources. For example, the wireless transmission interference can come from a device that is not compatible with the WLAN device, such as baby monitor 235a or microwave 235b of FIG. 2. The wireless transmission interference can come from another WLAN device, such as a WLAN device that is part of the same WLAN, or a WLAN device that is part of another WLAN.

For example, a building may have multiple businesses, and each business may have its own WLAN. Each business may have multiple WLAN devices, including multiple WLAN access points or WLAN repeaters. For example, the business may have one or more WLAN access points similar to access point 150 of FIG. 1C, and/or may have one or more WLAN repeaters, such as repeater 160 of FIG. 1C. In a first business which has multiple WLAN access points and repeaters, the access points and repeaters are distributed so that a person in any part of the building is able to communicate via an access point or repeater whose range covers that part of the building.

In order to provide adequate coverage, the access points and repeaters will have overlapping coverage areas where devices that are in the overlapping coverage area can receive communications from each of the access points or repeaters whose range extends to that area. As a result, a signal sent by a first access point or repeater to a destination device can be obstructed by interference from a signal sent by a second access point or repeater whose range also reaches to the destination device. Further, the signal sent by the first access point or repeater to the destination device can also be obstructed by a WLAN device of a second business, such as a business in the same building, in an adjacent building, etc., whose range similarly reaches the destination device.

The wireless interference can be detected in any of various ways. For example, the wireless interference can be detected by a determination that wireless transmission error rates, such as BER, PER, etc., have exceeded a predetermined level. The wireless interference can be detected by monitoring an energy level on a channel. When the energy level exceeds a predetermined level, or has exceeded a predetermined energy level for a predetermined length of time, a determination can be made that wireless interference has been detected. The wireless interference can be detected by monitoring traffic on a channel. When the traffic exceeds a predetermined threshold, or exceeds a predetermined threshold for a predetermined length of time, a determination can be made that wireless interference has been detected. The wireless interference can be detected when a "rogue" WLAN device is detected. A "rogue" WLAN device is a WLAN device that is determined to not adequately adhere to the IEEE 802.11 standard, or to deviate from the IEEE 802.11 standard in some way.

At block 920, a WLAN device, such as the first WLAN device or any other WLAN device that can communicate with the first WLAN device, can determine a second value for the wireless communication parameter. The determination of the second parameter can be based on the detection of the wireless interference at block 915, and can further be based on the type or characteristics of the wireless interference detected. In a first example, the wireless communication parameter is a parameter that controls or affects the size of a frame or packet, or that controls of affects whether MSDU or A-MSDU aggregation is used. Referring to FIG. 6, microwave 235b and baby monitor 235a both emit wireless signals that cause interference with wireless transmission by WLAN devices. In the example depicted in FIG. 6, the time when the channel is free from interference from these devices is fairly short, as is depicted by the time between electromagnetic signals 605 and 615. In many cases when a WLAN device is attempting to increase throughput, the WLAN device will attempt to increase frame or packet sizes, or will utilize MSDU aggregation. This increases the throughput because it reduces the overhead required to send a given amount of data. As can be seen in FIG. 3, each frame or packet includes overhead that is transmitted along with the data. Each frame or packet has additional overhead in the associated control signals, such as ACK, CTS, RTS, that are sent as part of the communication protocol. By increasing the size of a frame or packet, or utilizing MSDU aggregation, the amount of overhead required to transmit a given amount of data is reduced, resulting in higher throughput.

However, in the face of wireless interference of a certain type or with certain characteristics, such as being of long duration with short gaps between the interference signals, increasing the size of frames or packets or utilizing MSDU aggregation may actually reduce the throughput. A short gap between interference signals can be any gap that is less than a predetermined length of time. As can be seen in FIG. 6, the size of electromagnetic signal 620, which can be a frame or packet transmitted by base station 210a (and wherein the transmitted frame or packet can be an MSDU aggregation of multiple frames or packets), causes the transmission time of the frames or packets to exceed the time where the channel is clear, resulting in unsuccessful transmission of the frame or packet.

In order to increase throughput in such a case, a WLAN device can make a determination to set the second value to a value that reduces the size of the packet or frame when the wireless communication parameter is a parameter that controls or affects the size of a packet or frame, or a WLAN device can make a determination to set the second value to a value that causes MSDU aggregation to not be used when the wireless communication parameter is a parameter that controls or affects whether MSDU aggregation is used. The determination cab be based on a duty cycle of wireless interference being above a predetermined threshold. While not using MSDU increases the overhead of sending data, counterintuitively this can increase throughput, as is demonstrated in FIG. 6 where multiple frames or packets of data are successfully sent by base station 210a with electromagnetic signal 625, while the single large frame, packet, or block of data of electromagnetic signal 620 is not successfully transmitted due to being too long and colliding with electromagnetic signal 615.

In another example, the wireless communication parameter is a parameter that controls or affects MCS. In many cases when a WLAN device is attempting to increase throughput, the WLAN device will attempt to increase throughput by increasing the number of spatial streams, using a modulation type with higher data transmission rates, using a coding rate with a higher value, using a smaller value for GI, etc. (See FIG. 7.) However, in the face of wireless interference, such changes may actually reduce the throughput. In order to increase throughput in such a case, a WLAN device can make a determination to set the second value to a value that reduces the number of spatial streams, that uses a modulation type with lower data transmission rates, that uses a coding rate with a lower value, that uses a larger value for GI, etc. In some cases, the WLAN device can make a determination to set the second value to a value that limits MCS to a predetermined range. Maximum MCS requires very low wireless interference and very good signal to noise (SNR) on a channel, while minimum MCS can increase the transmission time of frames or packets such that the chance of collisions is increased. The predetermined range of MCS can be set so that the maximum MCS of the range is tuned based on the wireless interference level or SNR of a channel, and the minimum MCS of the predetermined range can be set so that the transmission time of frames or packets does not prohibitively increase the chance of collisions.

In yet another example, the wireless communication parameter is a parameter that controls or affects a transmission rate. In many cases when a WLAN device is attempting to increase throughput, the WLAN device will attempt to increase throughput by increasing transmission rates. However, in the face of wireless interference, such changes may actually reduce the throughput. In order to increase throughput in such a case, a WLAN device can make a determination to set the second value to a value that reduces a transmission rate, which can, for example, reduce transmission error rates induced by the wireless interference, and resultantly increase throughput. However, reducing transmission rate also increases the transmission time for a frame, packet, or block of data, which in certain circumstances, such as those discussed above with relation to reducing frame or packet size, can reduce throughput. In such cases, reducing transmission rates of some kinds of frames or packets, while keeping transmission rates of other types of frames or packets the same or increasing the transmission rates, may increase throughput.

In an example related to selective transmission rates, some control frames or packets, such as an ACK frame or packet, have a size that is much smaller than the maximum size of data frames or packets. In the example, a channel over which frames or packets will be transmitted has interference, and is free from interference for short durations. In this example, shorter frames or packets, such as an ACK frame or packet, can be transmitted at a slower transmission rate and still transmit in a short enough period of time to complete transmission during the short duration that the channel is free of interference. However, transmitting a maximum size data frame or packet at the slower transmission rate would cause the transmission time to exceed the short duration where the channel is free of interference, resulting in lower throughput for such data frames or packets.

In this example, overall throughput can be increased if the transmission rate of the ACK frames or packets is reduced, and the transmission rate of the data frames or packets is kept the same or possibly even increased. This is because the transmission error rates of ACK frames due to the interference can be reduced as a result of the lower transmission rate, while the transmission of the data frames can be completed within the short duration that the channel is free from interference. In this example, selectively transmitting a first type of data, such as control frames or packets, or frames or packets that are below a predetermined size, at a reduced transmission rate, while transmitting a second type of data, such as data frames of packets, at a transmission rate that is higher than the transmission rate of the first type of data, can result in increased throughput.

In an additional example, the wireless communication parameter is a parameter that controls or affects EDCA. In some cases, an offending WLAN device may implement a protocol that is not IEEE 802.11 compliant. The manufacturer of the offending WLAN device may have implemented a non-compliant protocol that attempts to improve throughput by more aggressively attempting to send frames or packets of data than would be the case with a compliant implementation of the protocol. In order to increase throughput in such a case, or when usage of a channel exceeds a predetermined threshold that indicates that the channel is busy, a WLAN device can make a determination to set the second value that is intended to increase throughput, such as to a value that causes an EDCA algorithm to be more aggressive in attempting to send frames or packets of data.

In another example, the wireless communication parameter is a parameter that controls or affects a threshold. In many cases when a WLAN device is attempting to increase throughput, the WLAN device will attempt to increase throughput by changing a threshold above which a channel is deemed to be busy, such as by reducing an ED threshold. When the ED threshold is reduced, a channel is more likely to be found busy because the lowered threshold results in a lower amount of energy needing to be detected before a channel is deemed busy. When there is less interference, a lowered threshold can result in increased throughput due to, for example, a reduction in collisions between transmitted frames or packets that result from the reduced threshold.

However, in an environment of sufficient wireless interference, a threshold may need to be continuously changed to increase throughput. In an example, an environment has a WLAN device that set a high ED threshold, and the WLAN device resultantly sends frames or packets that have increased collision rates. The environment also includes non-WLAN devices that emit wireless signals that create interference, such as a baby monitor or a microwave oven. In such an environment, a WLAN device can increase throughput in some cases by monitoring the wireless interference to notice patterns that enable the WLAN device to predict when there will be periods of higher wireless interference and periods of lower wireless interference. In such a case, the WLAN device can make a determination to set the second value to a value that changes a threshold, such as to a value that reduces an ED threshold, to take advantage of a predicted lower interference period. The WLAN device can adjust the second value to a value that increases the ED threshold when wireless interference is predicted to increase, or when increased levels of wireless interference are detected, or when the destination device is determined to be in a lower interference environment, etc. The WLAN device can monitor the wireless interference of the environment, and can continuously adjust the ED threshold to increase throughput.

In yet another example, the wireless communication parameter is a parameter that controls or affects whether an RTS/CTS protocol is used during wireless transmission. In many cases when a WLAN device is attempting to increase throughput, the WLAN device will attempt to increase throughput by utilizing an RTS/CTS protocol to avoid frame or packet collisions, such as collisions associated with the hidden node problem. The hidden node problem is a problem that occurs when a node is visible from an access point, but not from other nodes communicating with the access point, and that can lead to difficulties in the MAC sublayer. However, in the face of wireless interference of a certain type of with certain characteristics, such as being of long duration with short gaps between the interference signals, or such as when another WLAN device implements a protocol that is not IEEE 802.11 compliant and that does not properly recognize and respond to an RTS/CTS protocol, utilizing an RTS/CTS protocol may actually reduce the throughput.

In some cases, reduction of throughput can occur because utilization of an RTS/CTS protocol adds overhead of sending and receiving RTS/CTS frames or packets, which can cause the transmission time of a frame, packet, or block of data (including the RTS/CTS overhead) to increase to a duration that exceeds the duration of the short gaps, resulting in the frame or packet not being successfully received. In order to increase throughput in such a case, a WLAN device can make a determination to set the second value to a value that causes an RTS/CTS protocol to not be used. Not using the RTS/CTS protocol reduces the amount of overhead associated with sending a frame, packet, or block of data, which can reduce the transmission time of the frame, packet, or block of data sufficiently to enable the frame or packet to be successfully transmitted during the short gap between interference signals. In another case, reduction of throughput can occur because utilization of an RTS/CTS protocol enables other non-IEEE 802.11 compliant WLAN devices to obtain more transmission time by ignoring or improperly implementing an RTS/CTS protocol in a way that gives the offending device an advantage in obtaining transmission bandwidth.

In another example, the wireless communication parameter is a parameter that controls or affects whether beamforming is used during wireless transmission. In many cases when a WLAN device is attempting to increase throughput, the WLAN device will attempt to increase throughput by utilizing beamforming. Utilizing beamforming can increase the power of a transmitted signal at certain ranges, such as at a medium range, which can cause an increase in throughput. In one case, beamforming increases the power of a transmitted signal at a range of between 24 and 36 feet, resulting in increased throughput at this range. However, in the face of wireless interference of a certain type or with certain characteristics, utilizing beamforming may actually reduce the throughput.

For example, when a WLAN device utilizes beamforming, it needs to be concerned with link margin and needs to send training frames or packets in order to tune the beamforming connection and have adequate link margin. In the face of wireless interference, the overhead of the training has effects similar to the overhead issues discussed above. Further, increased levels of wireless interference can create sufficient collisions to prevent training from happening successful. In cases such as these, the WLAN device can make a determination to set the second value to a value that causes beamforming to not be used.

In another example, the wireless communication parameter is a parameter that controls or affects a MU-MIMO protocol is used during wireless transmission. For example, the wireless communication parameter can cause a MU-MIMO protocol to not be used, or can cause a MU-MIMO protocol to reduce a number of MU users. In many cases when a WLAN device is attempting to increase throughput, the WLAN device will attempt to increase throughput by utilizing a MU-MIMO protocol. A SU-MIMO protocol Utilizing a MU-MIMO protocol can increase throughput in a system where there are multiple users or connections. As discussed above, MU-MIMO enables a WLAN device to simultaneously transmit or receive data from each of multiple devices to which the WLAN device is streaming. In some embodiments, this is possible because each stream uses a different portion of a frequency band. However, MU-MIMO requires more overhead than, for example, SU-MIMO. In SU-MIMO, to successfully send data, a WLAN device can transmit a packet of data, and the receiver can respond to the transmission with an ACK. For some embodiments of MU-MIMO, to successfully send data, a WLAN device sends a Null Data Packet (NDP) announcement frame, then sends NDP packet frame. This is to enable the WLAN device to communicate with each of the multiple devices to which the WLAN is to stream. The WLAN device and the multiple devices send feedback to each other. MU-MIMO packet frame transmission can now occur, and a receiving device sends an ACK to acknowledge successful receipt of the frame of data.

As should be apparent, MU-MIMO data transmission has more overhead than, e.g., SU-MIMO. In an environment with little or no electronic interference, the negative impact on transmission data rates of a single stream due to the increased overhead is more than offset by the increased data rates of the multiple simultaneous data streams. However, in the face of wireless interference of a certain type or with certain characteristics, utilizing MU-MIMO may actually reduce the data throughput. In some cases, the wireless interference can result in more dropped frames and associated retries, which can lower the overall data throughput. In other cases, the wireless interference can result in lower transmission data rates for a single channel. In some cases when the data rate goes below a certain point, the overhead of MU-MIMO may be more than the increased throughput that results from the multiple simultaneous streams. In order to increase throughput in cases such as these, a WLAN device can make a determination to set the second value to a value that causes a MU-MIMO protocol to not be used, or that reduces a number of MU users. For example, the second value can be set to a value that causes SU-MIMO to be used, that reduces the number of MU users from four to two, etc.

Figure 10:
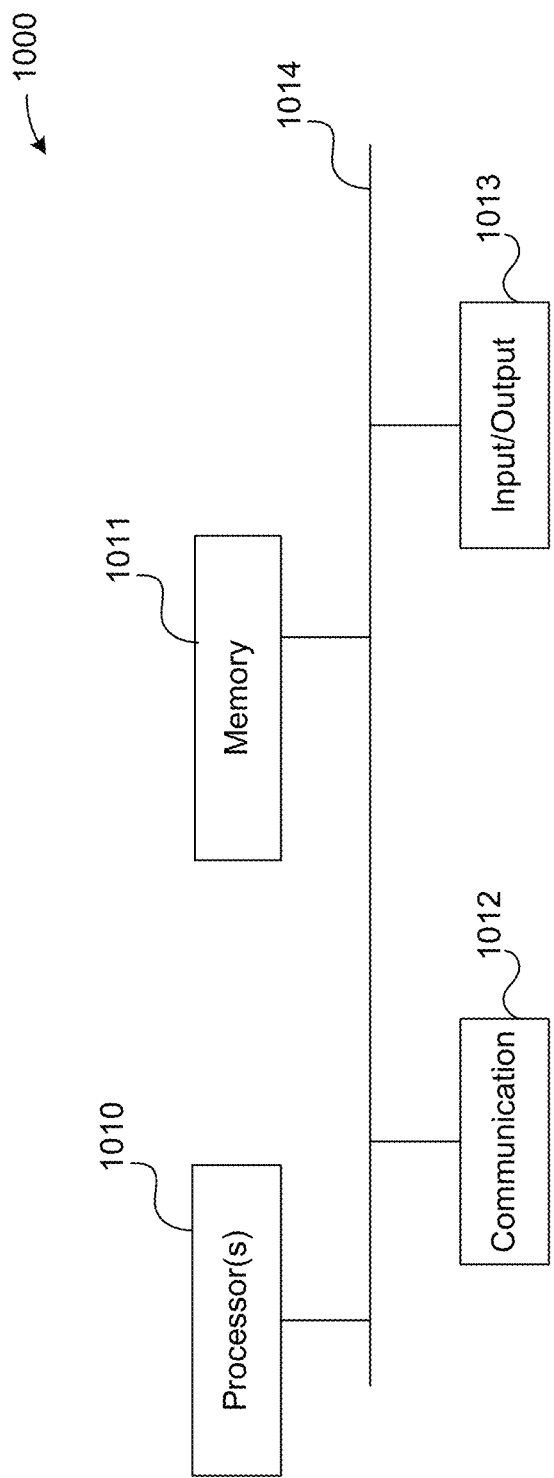
FIG. 10 is a block diagram illustrating an example of a processing system in which at least some operations described herein can be implemented, consistent with various embodiments.

FIG. 10 is a high-level block diagram showing an example of a processing device 1000 that can represent a system to run any of the methods/algorithms described above, consistent with various embodiments. A system may include two or more processing devices such as represented in FIG. 10, which may be coupled to each other via a network or multiple networks. A network can be referred to as a communication network.

In the illustrated embodiment, the processing device 1000 includes one or more processors 1010, memory 1011, a communication device 1012, and one or more input/output (I/O) devices 1013, all coupled to each other through an interconnect 1014. The interconnect 1014 may be or include one or more conductive traces, buses, point-to-point connections, controllers, adapters and/or other conventional connection devices. Each processor 1010 may be or include, for example, one or more general-purpose programmable microprocessors or microprocessor cores, microcontrollers, application specific integrated circuits (ASICs), programmable gate arrays, or the like, or a combination of such devices. The processor(s) 1010 control the overall operation of the processing device 1000. Memory 1011 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1011 may store data and instructions that configure the processor(s) 1010 to execute operations in accordance with the techniques described above. The communication device 1012 may be or include, for example, an Ethernet adapter, cable modem, Wi-Fi adapter, cellular transceiver, Bluetooth transceiver, or the like, or a combination thereof. Depending on the specific nature and purpose of the processing device 1000, the I/O devices 1013 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for improving wireless communication of data in an environment with electromagnetic interference, the method comprising:

during an initial interconnection setup between a transmitting wireless local area network (WLAN) device and a receiving WLAN device, negotiating any of a range of allowable sizes or a maximum size of aggregated frames, packets, or blocks of data; and with the transmitting WLAN device:

determining a target size for the aggregated frames, packets, or blocks of data, wherein the target size for the aggregated frames, packets, or blocks of data is within the negotiated range of allowable sizes or the maximum size of aggregated frames, packets, or blocks of data;

setting a wireless communication parameter to a first value, wherein the wireless communication parameter includes an aggregated frame, packet, or block size parameter that affects a size of the aggregated frames, packets or blocks of data, and wherein the first value is within the target size for the aggregated frames, packets, or blocks of data within the negotiated range of allowable sizes or the maximum size of aggregated frames, packets, or blocks of data;

wirelessly transmitting a first aggregated frame, packet, or block of data while the wireless communication parameter is set to the first value, wherein the wirelessly transmitting of the first aggregated frame, packet, or block of data conforms to the target size for the aggregated frames, packets, or blocks of data is within the negotiated range of allowable sizes or the maximum size of aggregated frames, packets, or blocks of data;

changing the wireless communication parameter to a second value, to improve wireless transmission performance, when electromagnetic interference is detected, wherein the second value conforms to the target size for the aggregated frames, packets, or blocks of data within the negotiated range of the allowable sizes or the maximum size of aggregated frames, packets, or blocks of data, and wherein the second value is less than the first value;

wirelessly transmitting a second aggregated frame, packet, or block of data while the wireless communication parameter is set to the second value, wherein the wirelessly transmitting of the second aggregated frame, packet, or block conforms to the target size for the aggregated frames, packets, or blocks of data is within the negotiated range of allowable sizes or the maximum size of aggregated frames, packets, or blocks of data;

changing the wireless communication parameter to the first value when the electromagnetic interference is reduced; and wirelessly transmitting a third aggregated frame, packet, or block of data after the wireless communication parameter has been changed to the first value, wherein the wirelessly transmitting of the third aggregated frame, packet, or block of data conforms to the target size for the aggregated frames, packets, or blocks of data is within the negotiated range of allowable sizes or the maximum size of aggregated frames, packets, or blocks of data.

2. The method of claim 1, further comprising:
changing the maximum size of the aggregated frames, packets, or blocks of data after repeated attempts to send aggregated blocks are unsuccessful.

3. The method of claim 2, wherein changing the maximum size of the aggregated frames, packets, or blocks of data is based on a renegotiation between the transmitting WLAN device and the receiving WLAN device.

4. A method comprising:

during an initial interconnection setup between a transmitting wireless local area network (WLAN) device and a receiving WLAN device, negotiating any of a range of allowable sizes or the maximum size of aggregated frames, packets, or blocks of data; and with the transmitting WLAN device:

determining a target size for the aggregated frames, packets, or blocks of data, wherein the target size for the aggregated frames, packets, or blocks of data is within the negotiated range of allowable sizes or the maximum size of aggregated frames, packets, or blocks of data;

setting a wireless communication parameter to a first value, wherein the wireless communication parameter includes an aggregated frame, packet, or block size parameter that affects a size of the aggregated frames, packets or blocks of data, and wherein the first value is within the target size for the aggregated frames, packets, or blocks of data within the negotiated range of the allowable sizes or the maximum size of aggregated frames, packets, or blocks of data;

wirelessly transmitting or receiving a first aggregated frame, packet, or block of data while the wireless communication parameter is set at the first value;

based on detection of electromagnetic interference, determining a second value for the wireless communication parameter to improve wireless transmission performance, wherein the second value conforms to the target size for the aggregated frames, packets, or blocks of data within the negotiated range of the allowable sizes or the maximum size of aggregated frames, packets, or blocks of data, and wherein the second value is less than the first value; and wirelessly transmitting or receiving a second aggregated frame, packet, or block of data while the wireless communication parameter is set at the second value.

5. The method of claim 4, wherein the detection of the electromagnetic interference includes detection that a wireless channel is busy more than a predetermined percentage of time over a predetermined duration of time.

6. The method of claim 4,
wherein the detection of the electromagnetic interference includes detection that the electromagnetic interference indicates data collisions,
wherein the determining the second value for the wireless communication parameter includes determining to set the aggregated block size parameter to the second value based on the detection that the electromagnetic interference includes the data collisions.

7. The method of claim 6, further comprising:
determining, when the wireless communication parameter is set to the second value, that a second amount of data collisions that occur when the wireless communication parameter is set to the second value is less than a first amount of data collisions that occur when the wireless communication parameter is set to the first value.

8. The method of claim 6, further comprising:
generating a selected aggregated frame, packet, or block of data that conforms to the aggregated block size parameter; and transmitting the selected aggregated frame, packet, or block of data.

9. The method of claim 6, wherein the wirelessly transmitting or receiving the first aggregated frame, packet, or block of data includes wirelessly receiving the aggregated frame, packet, or block of data at the receiving WLAN device, wherein the setting of the aggregated block size parameter to the first value includes sending the first value to the transmitting WLAN device, wherein wirelessly transmitting or receiving the second aggregated frame, packet, or block of data includes wirelessly receiving the second aggregated frame, packet, or block of data, and wherein the setting of the aggregated block size parameter to the second value includes sending the second value to the transmitting WLAN device to cause the transmitting WLAN device to transmit data that conforms to the second value.

10. A computer system comprising:
a processor;
a networking interface coupled to the processor; and
a memory coupled to the processor and storing instructions which, when executed by the processor, cause the computer system to perform the method of claim 4.

11. The method of claim 4, further comprising:
changing the maximum size of the aggregated frames, packets, or blocks of data after repeated attempts to send aggregated blocks are unsuccessful.

12. The method of claim 11, wherein changing the maximum size of the aggregated frames, packets, or blocks of data is based on a renegotiation between the transmitting WLAN device and the receiving WLAN device.

* * * * *